United States Patent
Takashima et al.

(10) Patent No.: US 11,420,247 B2
(45) Date of Patent: *Aug. 23, 2022

(54) HOT-PRESSED MEMBER AND METHOD FOR MANUFACTURING SAME, AND COLD-ROLLED STEEL SHEET FOR HOT PRESSING AND METHOD FOR MANUFACTURING SAME

(71) Applicant: JFE STEEL CORPORATION, Tokyo (JP)

(72) Inventors: Katsutoshi Takashima, Tokyo (JP); Takashi Kobayashi, Tokyo (JP); Yoshimasa Funakawa, Tokyo (JP); Seiji Nakajima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 257 days.

This patent is subject to a terminal disclaimer.

(21) Appl. No.: 16/618,243

(22) PCT Filed: Mar. 30, 2018

(86) PCT No.: PCT/JP2018/013717
§ 371 (c)(1),
(2) Date: Nov. 29, 2019

(87) PCT Pub. No.: WO2019/003539
PCT Pub. Date: Jan. 3, 2019

(65) Prior Publication Data
US 2020/0353527 A1  Nov. 12, 2020

(51) Int. Cl.
| | | |
|---|---|---|
| *B32B 15/00* | (2006.01) |
| *B21D 22/02* | (2006.01) |
| *B32B 15/01* | (2006.01) |
| *C21D 1/18* | (2006.01) |
| *C21D 6/00* | (2006.01) |
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/24* | (2006.01) |
| *C22C 38/26* | (2006.01) |
| *C22C 38/32* | (2006.01) |
| *C22C 38/42* | (2006.01) |
| *C22C 38/44* | (2006.01) |

(Continued)

(52) U.S. Cl.
CPC .......... *B21D 22/022* (2013.01); *B32B 15/012* (2013.01); *B32B 15/013* (2013.01); *C21D 1/18* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/24* (2013.01); *C22C 38/26* (2013.01); *C22C 38/32* (2013.01); *C22C 38/42* (2013.01); *C22C 38/44* (2013.01); *C22C 38/50* (2013.01); *C23C 30/005* (2013.01); *C21D 2211/004* (2013.01); *C21D 2211/008* (2013.01)

(58) Field of Classification Search
None
See application file for complete search history.

(56) References Cited

U.S. PATENT DOCUMENTS

| | | |
|---|---|---|
| 8,241,759 B2 | 8/2012 | Nakagaito et al. |
| 9,353,424 B2 | 5/2016 | Tanahashi et al. |

(Continued)

FOREIGN PATENT DOCUMENTS

| | | |
|---|---|---|
| CN | 102939399 A | 2/2013 |
| CN | 105940134 A | 9/2016 |

(Continued)

OTHER PUBLICATIONS

Jan. 28, 2021, Office Action issued by the China National Intellectual Property Administration in the corresponding Chinese Patent Application No. 201880042714.5 with English language search report.

(Continued)

*Primary Examiner* — Seth Dumbris
*Assistant Examiner* — Kim S. Horger
(74) *Attorney, Agent, or Firm* — Kenja IP Law PC

(57) ABSTRACT

Disclosed is a hot-pressed member that can exhibit very high tensile strength after hot pressing of 1780 MPa or more, excellent delayed fracture resistance, and high cross tensile strength after resistance spot welding by properly adjusting its chemical composition and its microstructure such that a prior austenite average grain size is 8 μm or less, a volume fraction of martensite is 90% or more, and at least 10 cementite grains having a grain size of 0.05 μm or more are present on average per 200 μm² of a cross section parallel to a thickness direction of the member, and such that at least 10 Ti-based precipitates having a grain size of less than 0.10 μm are present on average per 100 μm² of the cross section parallel to the thickness direction of the member in a range of 100 μm in the thickness direction from a surface of the member.

9 Claims, No Drawings

(51) Int. Cl.
*C22C 38/50* (2006.01)
*C23C 30/00* (2006.01)

(56) References Cited

U.S. PATENT DOCUMENTS

| | | |
|---|---|---|
| 9,938,597 B2 | 4/2018 | Murakami et al. |
| 9,970,073 B2 | 5/2018 | Kawano et al. |
| 10,060,005 B2 | 8/2018 | Hikida et al. |
| 10,174,396 B2 | 1/2019 | Takashima et al. |
| 11,085,101 B2 * | 8/2021 | Takashima ............... C21D 9/46 |
| 11,111,558 B2 * | 9/2021 | Takashima ............... C21D 1/18 |
| 11,136,643 B2 | 10/2021 | Takashima et al. |
| 2009/0238715 A1 | 9/2009 | Cho et al. |
| 2013/0095347 A1 | 4/2013 | Kawasaki et al. |
| 2014/0290807 A1 | 10/2014 | Goto et al. |
| 2016/0222483 A1 * | 8/2016 | Murakami ............... C22C 38/06 |
| 2016/0369369 A1 * | 12/2016 | Takashima ............... C22C 38/16 |
| 2017/0096724 A1 | 4/2017 | Hikida et al. |

FOREIGN PATENT DOCUMENTS

| | | |
|---|---|---|
| EP | 2975150 A1 | 1/2016 |
| EP | 3124637 A1 | 2/2017 |
| JP | 2006152427 A | 6/2006 |
| JP | 2007314817 A | 12/2007 |
| JP | 2010174278 A | 8/2010 |
| JP | 2013185245 A | 9/2013 |
| JP | 2014122398 A | 7/2014 |
| JP | 2015113500 A | 6/2015 |
| JP | 2017043825 A | 3/2017 |
| WO | 2015147216 A1 | 10/2015 |

OTHER PUBLICATIONS

Kuaishe Wang et al., Metal Coating Technology, Sep. 30, 2014, p. 281.

Yuqing Weng et al., Ultra-Fine Grained Steels Microstructure Fining Theory and Control Technology of Steels, Sep. 30, 2003, pp. 436-437, 977, 979.

Mar. 6, 2020, the Extended European Search Report issued by the European Patent Office in the corresponding European Patent Application No. 18824881.9.

Jun. 26, 2018, International Search Report issued in the International Patent Application No. PCT/JP2018/013717.

* cited by examiner

HOT-PRESSED MEMBER AND METHOD FOR MANUFACTURING SAME, AND COLD-ROLLED STEEL SHEET FOR HOT PRESSING AND METHOD FOR MANUFACTURING SAME

BACKGROUND

The present disclosure relates to a hot-pressed member and a method for manufacturing the same, and a cold-rolled steel sheet for hot pressing and a method for manufacturing the same, and particularly to the improvement of delayed fracture resistance and resistance spot weldability of a hot-pressed member.

As used herein, the term "hot-pressed member" refers to a member obtained by hot press forming a cold-rolled steel sheet having quench hardenability to increase its strength.

In addition, examples of the cold-rolled steel sheet disclosed herein include not only general cold-rolled steel sheets, but also hot-dip galvanized cold-rolled steel sheets (including galvannealed cold-rolled steel sheets), electrogalvanized cold-rolled steel sheets (including zinc-nickel alloy-electroplated cold-rolled steel sheets), and aluminum-coated or aluminum-plated cold-rolled steel sheets.

BACKGROUND

In recent years, $CO_2$ emission regulations have become more stringent due to rising environmental problems, and in the automobile field, weight reduction of vehicle bodies has become an issue for reduced fuel consumption. To this end, sheet metal thinning by application of high-strength steel sheets to automobile parts is advanced, and application of steel sheets with tensile strength (TS) of 1780 MPa or more is considered.

High-strength steel sheets used for structural members and reinforcing members of automobiles are required to have excellent formability. However, in a steel sheet with TS of 1780 MPa or more, cracking would occur during cold press forming due to low ductility and large spring back would occur due to high yield strength. Therefore, after cold press forming, high dimension accuracy can not be obtained. In addition, since residual stress remains in the steel sheet after cold press forming, delayed fracture (hydrogen embrittlement) may be caused by hydrogen intruding from the use environment.

Under such circumstances, as a method for obtaining high strength, recently, press forming by hot pressing (also referred to as hot stamping, die quenching, press quenching, and so on) has been focused. Hot pressing is a forming method that enables forming with high dimensional accuracy by heating a steel sheet to the temperature range of austenite single phase and then forming (processing) the steel sheet at the high temperature, and that enables increase of the strength through quenching by cooling the steel sheet after the forming. Moreover, in this hot pressing, since the residual stress after press forming is reduced as compared with cold pressing, the delayed fracture resistance is also improved.

However, although many automobile assembly processes are accomplished by resistance spot welding, stress is also applied to the members after being subjected to hot pressing in order to maintain the rigidity of the entire automobile body. Thus, the concern of delayed fracture after press forming can not be ruled out. Therefore, it is necessary to improve the delayed fracture resistance of the member after being subjected to hot pressing.

Moreover, in order to guarantee a tensile strength of 1780 MPa or more, it is necessary to contain a large amount of alloying elements (such as C), which, however, leads to a significant reduction in the cross tensile strength (CTS) of a joint after resistance spot welding.

Conventionally, several means for improving delayed fracture resistance after hot pressing have been reported.

For example, JP2015-113500A (PTL 1) describes a technique for improving delayed fracture resistance by controlling the amount of precipitation of alloy carbonitrides or cementite.

In addition, JP2014-122398A (Patent Document 2) describes a technique for improving delayed fracture resistance by enabling formation of retained austenite after hot pressing.

CITATION LIST

Patent Literature

PTL 1: JP2015-113500A
PTL 2: JP2014-122398A

SUMMARY

Technical Problem

However, the Ti-based carbides described in PTL 1 are insufficient for achieving the reduction of the prior austenite grain size, or for serving as a hydrogen trapping site for hydrogen entering from the surface. Thus, it can not be said that these carbides have sufficient delayed fracture resistance. Furthermore, it can not be said that the cross tensile strength after resistance spot welding is secured.

In the technique of PTL 2, retained austenite can be a hydrogen trapping site, yet if retained austenite having a high C concentration is present, the hardness distribution becomes broader in the heat-affected zone (HAZ) after resistance spot welding, and the cross tensile strength decreases.

As described above, it is considered difficult to improve both the delayed fracture resistance of a hot-pressed member with TS of 1780 MPa or more and the cross tensile strength after resistance spot welding, and a hot-pressed member showing improvement in both of these properties has not been developed.

Solution to Problem

Therefore, as a result of intensive investigations in view of the above situation, the present inventors discovered that in order to improve both the delayed fracture resistance of a hot-pressed member and the cross tensile strength after resistance spot welding, it is effective to, as the microstructure of the member, cause fine Ti-based precipitates to disperse on the surface layer of the member, and to precipitate cementite in martensite as a hydrogen trapping site, thereby achieving both excellent delayed fracture resistance and improved cross tensile strength after resistance spot welding.

Specifically, dispersing fine Ti-based precipitates in a surface layer of a steel sheet makes it possible to reduce the average prior austenite grain size and to cause Ti-based precipitates to serve as hydrogen trapping sites for hydrogen entering from the surface due to corrosion, thereby improving the delayed fracture resistance.

In addition, since Ti-based precipitates enable refinement of the microstructure in the heat-affected zone (HAZ) even after a temperature rise resulting from resistance spot welding, with the result that the toughness against the stress applied to a nugget end can be improved, hardness reduction due to HAZ softening is also suppressed, and thus the cross tensile strength can be increased.

Furthermore, when cementite is dispersed in the martensite of the microstructure of the member, the cementite becomes a hydrogen trapping site and contributes to the improvement of the delayed fracture resistance. The inventors also discovered that the presence of cementite grains having a grain size of 0.05 μm or more results in incomplete dissolution of cementite in the HAZ softened portion after resistance spot welding and a reduction in the amount of solute C, making it possible to achieve proper toughness and improved cross tensile strength.

In addition, with regard to the steel components of a member, when the Mn content increases, the phase transformation behavior in the nugget changes, and δ phase transformation occurs only partially or does not occur, and thus transformation takes place from liquid to γ phase. Accordingly, Mn and P remain segregated, segregation at nugget ends becomes remarkable after welding, and the segregated portions becomes brittle, making it difficult to secure cross tensile strength. Therefore, it is preferable to consider the addition amount of C, Mn, and P. In addition, when the Mn content is low, the quench hardenability at the time of hot pressing can not be ensured, and it becomes difficult to ensure proper tensile strength after hot pressing. However, by increasing the content of Cr and Mo, the quench hardenability can be ensured. In addition, Cr and Mo are useful because they have little influence on the above-mentioned transformation behavior in the nugget. Furthermore, Ti affects the securing of delayed fracture resistance and cross tensile strength as described above.

Therefore, in terms of components, it is preferable to improve the delayed fracture resistance and the cross tensile strength in consideration of the ratio of the amounts of C, Mn, and P added to the amounts of Cr, Mo, and Ti added. The present disclosure was completed based on the above discoveries.

Specifically, primary features of the present disclosure are as follows.

1. A hot-pressed member comprising: a steel chemical composition containing (consisting of), by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, Ti: 0.005% or more and 0.15% or less, and at least one selected from the group consisting of Mo: 0.50% or less and Cr: 0.50% or less, with the balance being Fe and inevitable impurities; a microstructure in which a prior austenite average grain size is 8 μm or less, a volume fraction of martensite is 90% or more, and at least 10 cementite grains having a grain size of 0.05 μm or more are present on average per 200 μm$^2$ of a cross section parallel to a thickness direction of the member, and at least 10 Ti-based precipitates having a grain size of less than 0.10 μm are present on average per 100 μm$^2$ of the cross section parallel to the thickness direction of the member in a range of 100 μm in the thickness direction from a surface of the member; and a tensile strength of 1780 MPa or more.

2. The hot-pressed member according to 1., wherein the steel chemical composition further contains, by mass %, at least one selected from the group consisting of Nb: 0.15% or less, B: 0.0050% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

3. The hot-pressed member according to 1. or 2., wherein among other components in the steel chemical composition of the member, C, P, Mn, Cr, Mo, and Ti satisfy:

$$(6[C]+2[Mn]+49[P])/([Cr]/2+[Mo]/3+7[Ti])\leq 30.5 \quad (1),$$

where [M] denotes the content by mass % of an element M, and is calculated as 0 when the element [M] is not contained.

4. The hot-pressed member according to any one of 1. to 3., comprising, on a surface layer thereof, an Al or Al alloy coating or plating layer or a Zn or Zn alloy coating or plating layer.

5. A cold-rolled steel sheet for hot pressing, comprising: a chemical composition containing (consisting of), by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, Ti: 0.005% or more and 0.15% or less, and at least one selected from the group consisting of Mo: 0.50% or less and Cr: 0.50% or less, with the balance being Fe and inevitable impurities; and a microstructure which contains 5% to 45% by volume fraction of martensite having an average grain size of 4 μm or less, and at least 15 Ti-based precipitates having a grain size of less than 0.10 μm present on average per 100 μm$^2$ of a cross section parallel to the thickness direction of the steel sheet in a range of 100 μm in the thickness direction from the surface of the steel sheet.

6. The cold-rolled steel sheet for hot pressing according to 5., wherein the chemical composition further contains, by mass %, at least one selected from Nb: 0.15% or less, B: 0.0050% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

7. The cold-rolled steel sheet for hot pressing according to 5. or 6., wherein among other components in the steel chemical composition of the steel sheet, C, P, Mn, Cr, Mo, and Ti satisfy:

$$(6[C]+2[Mn]+49[P])/([Cr]/2+[Mo]/3+7[Ti])\leq 30.5 \quad (1),$$

where [M] denotes the content by mass % of an element M, and is calculated as 0 when the element [M] is not contained.

8. The cold-rolled steel sheet for hot pressing according to any one of 5. to 7., wherein the steel sheet comprises on a surface thereof an Al or Al alloy coating or plating layer or a Zn or Zn alloy coating or plating layer.

9. A method for manufacturing the cold-rolled steel sheet for hot pressing as recited in 5., the method comprising: preparing a molten steel comprising a chemical composition containing (consisting of), by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, Ti: 0.005% or more and 0.15% or less, and at least one selected from the group consisting of Mo: 0.50% or less and Cr: 0.50% or less, with the balance being Fe and inevitable impurities, subjecting the molten steel to continuous casting to obtain a slab, and cooling the slab to 650° C. within 6 hours; then reheating and hot rolling the slab to obtain a hot-rolled steel sheet under a set of conditions including a rolling reduction of 12% or more at a final pass of finish rolling, a rolling reduction of 15% or more at a pass immediately before the final pass, and a finisher delivery temperature of 860° C. to 950° C.; after the hot rolling, subjecting the hot-rolled steel sheet to primary cooling whereby the hot-rolled steel sheet is cooled to a cooling end temperature of 700° C. or lower at a first average cooling rate of 70° C./s or higher up to the cooling end temperature; after the primary cooling, subjecting the steel sheet to secondary cooling whereby the steel sheet is coiled at a coiling temperature of 450° C. or lower at a second average cooling rate of 5° C./s to 50° C./s up to the coiling temperature; then pickling the coiled hot-rolled steel sheet, and then cold rolling the steel sheet to obtain a cold-rolled steel sheet, then subjecting the cold-rolled steel sheet to annealing whereby the cold-rolled steel sheet is heated to a temperature range of 700° C. to 830° C. at an average heating rate of 5° C./s to 20° C./s and subjected to 15 seconds to 600 seconds of soaking in the temperature range of 700° C. to 830° C.; and after the soaking, subjecting the cold-rolled steel sheet to a tertiary cooling whereby the cold-rolled steel sheet is cooled to a cooling end temperature of 600° C. or lower at a third average cooling rate of 5° C./s or higher.

10. The method for manufacturing a cold-rolled steel sheet for hot pressing according to 9, wherein the chemical composition further contains, by mass %, at least one selected from the group consisting of Nb: 0.15% or less, B: 0.0050% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

11. The method for manufacturing a cold-rolled steel sheet for hot pressing according to 9. or 10., wherein among other components in the chemical composition of the molten steel, C, P, Mn, Cr, Mo, and Ti satisfy:

$$(6[C]+2[Mn]+49[P])/([Cr]/2+[Mo]/3+7[Ti])\leq30.5 \qquad (1),$$

where [M] denotes the content by mass % of an element M, and is calculated as 0 when the element [M] is not contained.

12. The method for manufacturing a cold-rolled steel sheet for hot pressing according to any one of 9. to 11., the method further comprising: after the tertiary cooling, applying an Al or Al alloy coating or plating treatment or a Zn or Zn alloy coating or plating treatment to a surface of the cold-rolled steel sheet.

13. A method for manufacturing a hot-pressed member, comprising: heating the cold-rolled steel sheet for hot pressing as recited in any one of 5. to 8. in a temperature range of an $Ac_3$ transformation temperature to 1000° C.; and then hot pressing the steel sheet.

Advantageous Effect

According to the present disclosure, it is possible to obtain a hot-pressed member which has extremely high tensile strength after hot pressing and also has excellent delayed fracture resistance and high cross tensile strength after resistance spot welding. For example, it is possible to stably obtain a hot-pressed member which is excellent in delayed fracture resistance and in cross tensile strength after resistance spot welding, and which has a tensile strength of 1780 MPa or more, in which no cracking occurs even after immersion in hydrochloric acid, and which has a cross tensile strength after resistance spot welding of 5 kN or more (preferably 6.5 kN or more) under the condition of a nugget diameter of 6.1 mm.

Further, according to the present disclosure, it is possible to obtain a hot-pressed member with stable properties even under hot pressing conditions with large variations at the time of heating.

DETAILED DESCRIPTION

The following provides the details of the present disclosure.

First, the microstructures of the hot-pressed member and the cold-rolled steel sheet for hot pressing according to the present disclosure will be described in detail.

[Microstructure of Hot-Pressed Member]

The microstructure of the hot-pressed member is a microstructure such that a prior austenite average grain size of 8 μm or less, a volume fraction of martensite is 90% or more, and at least 10 cementite grains having a grain size of 0.05 μm or more are present on average per 200 μm² in a cross section parallel to the thickness direction of the member, and such that at least 10 Ti-based precipitates having a grain size of less than 0.10 μm are present on average per 100 μm² of the cross section parallel to the thickness direction in a range of 100 μm in the thickness direction from a surface of the member.

When the prior austenite average grain size is more than 8 μm, the delayed fracture resistance is deteriorated. Therefore, an upper limit is 8 μm. It is preferably 7 μm or less, and more preferably 6.5 μm or less.

In addition, when the volume fraction of martensite is less than 90%, it is difficult to achieve a tensile strength of 1780 MPa or more. Therefore, the volume fraction of martensite is 90% or more. It is preferably 93% or more, and more preferably 95% or more. It may be 100%.

The residual microstructures include ferrite, bainite, pearlite, and the like, and a total content of 4% or less is allowable.

In a cross section parallel to the thickness direction of the member after being subjected to hot pressing, it is necessary to contain at least 10, preferably at least 20, cementite grains having a grain size of 0.05 μm or more present on average per 200 μm². Such formation of cementite grains serves as hydrogen trapping sites, contributes to the improvement of delayed fracture resistance, and results in incomplete dissolution of cementite in the HAZ softened portion after resistance spot welding and a reduction in the amount of solute C. Consequently, the toughness in the HAZ softened portion after welding is improved, and thus the cross tensile strength is increased. On the other hand, if the grain size of cementite grains is less than 0.05 μm, or if the number of cementite grains is less than 10 on average even when the grain size thereof is 0.05 μm or more, the delayed fracture resistance and the cross tensile strength after resistance spot welding are degraded. The upper limit of the grain size of cementite is not particularly provided, yet is preferably 1 μm or less.

Here, even if cementite grains having a grain size of less than 0.05 μm are present, it is possible to secure desired properties as long as at least 10 cementite grains having a grain size of 0.05 μm or more are present on average. The cross section parallel to the thickness direction of the member to be measured is not particularly limited, and may be taken at any position.

In addition, it is necessary that at least 10, preferably at least 15, Ti-based precipitates having a grain size of less than 0.10 μm in a range of 100 μm in the thickness direction from the surface of the member are present on average per 100 μm² of the cross section parallel to the thickness direction of the member. In this way, by dispersing Ti-based precipitates having a grain size of less than 0.10 μm in the surface layer of the member, the delayed fracture resistance and the cross tensile strength after resistance spot welding are improved. On the other hand, if the grain size of Ti-based precipitates is 0.10 μm or more, or if the number of Ti-based precipitates is less than 10 on average even when the grain size thereof is less than 0.10 μm, it is not possible to provide sufficient improvement in delayed fracture resistance and cross tensile strength after resistance spot welding. Here, examples of such Ti-based precipitates include TiC, and TiN, Ti(C,N). Further, even if Ti-based precipitates having a grain size of 0.10 μm or more are present, it is possible to secure desired properties as long as at least 10 Ti-based precipitates having a grain size of less than 0.10 μm are present on average. The cross section parallel to the thickness direction of the member to be measured is not particularly limited, and may be taken at any position. Further, the lower limit of the target grain size of Ti-based precipitates is 0.005 μm.

[Microstructure of Cold-Rolled Steel Sheet for Hot Pressing]

In order to obtain desired properties as a hot pressed member, it is important to control the microstructure of the cold-rolled steel sheet for hot pressing. That is, as the microstructure of the cold-rolled steel sheet for hot pressing is a microstructure which contains martensite having an average grain size of 4 μm or less in a range of 5% to 45% by volume fraction, and in which at least 15 Ti-based precipitates having a grain size of less than 0.10 μm are present on average per 100 μm$^2$ of a cross section parallel to the thickness direction of the steel sheet in a range of 100 μm in the thickness direction from the surface layer.

In the cold-rolled steel sheet for hot pressing, if the average grain size of martensite exceeds 4 μm, the concentration distribution of C and Mn changes during hot pressing such that the desired cementite dispersion state can not be obtained, and the delayed fracture resistance and the cross tensile strength are lowered. In addition, if the volume fraction of martensite is below 5% or above 45%, the desired cementite dispersion state can not be obtained similarly, and the delayed fracture resistance and the cross tensile strength decrease. Preferably, the volume fraction of martensite is in a range of 10% to 40%.

In addition, since some Ti-based precipitates are coarsened by hot pressing, if the number of Ti-based precipitates having a grain size of less than 0.10 μm is less than 15 per 100 μm$^2$ on average in a cross section parallel to the thickness direction of the cold-rolled steel sheet, the desired dispersion of Ti-based precipitates can not be obtained after hot pressing, and the delayed fracture resistance and the cross tensile strength after resistance spot welding may be lowered. Therefore, in the cold-rolled steel sheet before being subjected to hot pressing, at least 15, preferably at least 20, Ti-based precipitates having a grain size of less than 0.10 μm are present on average per 100 μm$^2$ of a cross section parallel to the thickness direction of the steel sheet in a range of 100 μm in the thickness direction from the surface layer. In addition, no particular limitation is placed on the cross section parallel to the thickness direction of the steel sheet to be measured, and a so-called C or L cross section may be used.

Furthermore, in order to obtain the desired prior austenite grain size after hot pressing, it is preferable that the microstructure of the cold-rolled steel sheet before being subjected to hot pressing contains 20% or more by volume fraction of ferrite having an average aspect ratio of 3.0 or less and an average grain size of 7 μm or less. A preferred upper limit of this volume fraction is 80%. The reason is that C and Mn are concentrated in hard phases other than ferrite, and a desired prior austenite grain size can not be obtained after hot pressing.

The residual microstructures include bainite, pearlite, and the like, and a total content of 25% or less is allowable.

In the cold-rolled steel sheet for hot pressing, the requirement that the volume fraction of martensite having an average grain size of 4 μm or less be in the range of 5% to 45% is mainly satisfied by the continuous casting, hot rolling, and annealing steps in the process of manufacturing the cold-rolled steel sheet described later. In addition, the requirement that at least 15 Ti-based precipitates having a grain size of less than 0.10 μm be present on average per 100 μm$^2$ of the cross section parallel to the thickness direction of the steel sheet in the range of 100 μm in the thickness direction from the surface of the steel sheet is mainly satisfied by the continuous casting, hot rolling, and annealing steps.

Next, appropriate compositional ranges of the hot-pressed member and the cold-rolled steel sheet for hot pressing according to the present disclosure will be described. When components are expressed in "%", this refers to "mass %".

C: 0.28% or More and Less than 0.42%

C is an element effective for increasing the strength of the steel, and is an important element for strengthening martensite after hot pressing to increase the strength of the steel. However, if the C content is less than 0.28%, the hardness of martensite after hot pressing is insufficient, and a tensile strength of 1780 MPa or more can not be obtained. The C content is preferably 0.30% or more. On the other hand, when C is added by 0.42% or more, the hardness after resistance spot welding increases, the toughness decreases, and the cross tensile strength decreases. Therefore, the C content is less than 0.40%. Preferably, it is less than 0.39%.

Si: 1.5% or Less

Si is an element effective for solid solution strengthening of ferrite and increasing the strength. However, excessive addition of Si lowers the toughness at the time of resistance spot welding and deteriorates the cross tensile strength. Therefore, the Si content is 1.5% or less. It is preferably 1.2% or less. Although the lower limit of the Si content is not particularly specified, it is preferable to set it at 0.005% because making the Si content extremely low leads to an increase in cost.

Mn: 1.1% or More and 2.4% or Less

Mn is an element that increases the quench hardenability during hot pressing, and thus contributes to the formation of martensite after hot pressing, that is, the increase in strength. To obtain this effect, the Mn content needs to be 1.1% or more. Preferably, it is 1.3% or more. On the other hand, when Mn is excessively added, P segregates after resistance spot welding and the cross tensile strength decreases. Therefore, the Mn content is 2.4% or less. It is preferably 2.2% or less, and more preferably less than 2.0%.

P: 0.05% or Less

P contributes to the increase in strength by solid solution strengthening. However, when added excessively, segregation of P at grain boundaries becomes remarkable, the grain boundaries are embrittled, and the cross tensile strength after resistance spot welding is lowered. Therefore, the P content is 0.05% or less. Preferably, it is 0.02% or less. Although the lower limit of the P content is not particularly specified, it is preferable to set it at 0.0005% because making the P content extremely low leads to an increase in steelmaking cost.

S: 0.005% or Less

When the S content is high, a large amount of sulfides such as MnS is formed, and inclusions serve as a starting point of cracking upon entry of hydrogen, causing deterioration of the delayed fracture resistance. Therefore, an upper limit of the S content is 0.005%. Preferably, it is 0.0045% or less. Although the lower limit of the S content is not particularly specified, it is preferable to set it at 0.0002% because, as is the case with P, making the S content extremely low leads to an increase in steelmaking cost.

Al: 0.01% or More and 0.50% or Less

Al is an element necessary for deoxidation. To obtain this effect, the Al content needs to be 0.01% or more. On the other hand, adding Al beyond 0.50% does not increase this effect. Therefore, the Al content is 0.50% or less. Preferably, it is 0.40% or less.

N: 0.010% or Less

Since N forms a coarse nitride and degrades the delayed fracture resistance, it is necessary to suppress the content. In particular, when the N content exceeds 0.010%, this tendency becomes remarkable. Therefore, the N content is 0.010% or less. Preferably, it is 0.008% or less.

Ti: 0.005% or More and 0.15% or Less

Ti is an element that contributes to the increase in strength by forming fine carbonitrides. Furthermore, in the present disclosure, dispersing fine Ti precipitates on the surface layer of the member contributes to the refinement of hydrogen trapping sites and crystal grains in the microstructure of the member after spot welding, and has the effect of improving the delayed fracture resistance and the cross tensile strength after resistance spot welding. To obtain this effect, the Ti content needs to be 0.005% or more. Preferably, it is 0.010% or more. On the other hand, when a large amount of Ti is added, the elongation after hot pressing is significantly reduced. Therefore, the Ti content is 0.15% or less. Preferably, it is 0.12% or less.

Mo: 0.50% or Less

Mo is an element that increases the quench hardenability during hot pressing, and thus contributes to the formation of martensite after hot pressing, that is, the increase in strength. To obtain this effect, the Mo content is preferably 0.005% or more. It is more preferably 0.01% or more. On the other hand, even if a large amount of Mo is added, the above effect is saturated, leading to an increase in cost, and causing deterioration of the chemical conversion treatment property. Therefore, the Mo content is 0.50% or less.

Cr: 0.50% or Less

Cr, like Mo, is an element that increases the quench hardenability during hot pressing, and thus contributes to the formation of martensite after hot pressing, that is, the increase in strength. To obtain this effect, the Cr content is preferably 0.005% or more. It is more preferably 0.01% or more. On the other hand, even if a large amount of Cr is added, the above effect is saturated, and a surface oxide is formed, deteriorating the coatability. Therefore, the Cr content is 0.50% or less.

Further, in the present disclosure, it is preferable that among other components in the chemical composition, C, P, Mn, Cr, Mo, and Ti satisfy:

$$(6[C]+2[Mn]+49[P])/([Cr]/2+[Mo]/3+7[Ti]) \leq 30.5 \quad (1),$$

where [M] denotes the content by mass % of an element M.

The above expression is an index for securing delayed fracture resistance and cross tensile strength. When the value on the left side exceeds 30.5, it may be difficult to ensure both delayed fracture resistance and cross tensile strength.

Furthermore, in the present disclosure, the following components can be appropriately contained.

Nb: 0.15% or Less

Nb is an element that contributes to the increase in strength by forming fine carbonitrides. Moreover, in the present disclosure, as fine Nb-based precipitates serve as hydrogen trapping sites and also refine the austenite grain size during hot pressing, Nb is an element that contributes to the improvement of the delayed fracture resistance and cross tensile strength after resistance spot welding. To obtain this effect, the Nb content is preferably 0.005% or more. On the other hand, even if a large amount of Nb is added, the above effect is saturated, leading to an increase in cost. Therefore, the Nb content is preferably 0.15% or less. It is more preferably 0.12% or less, and even more preferably 0.10% or less.

B: 0.0050% or Less

B is an element that increases the quench hardenability during hot pressing, and thus contributes to the formation of martensite after hot pressing, that is, the increase in strength. B also improves the grain boundary strength by segregation at grain boundaries, it is effective for increasing the delayed fracture resistance. To obtain this effect, the B content is preferably 0.0002% or more. However, it is preferable that the B content be 0.0050% or less, because excessive addition of B deteriorates toughness and reduces cross tensile strength after resistance spot welding. The B content is more preferably 0.0040% or less.

Sb: 0.001% or More and 0.020% or Less

Sb has the effect of suppressing the formation of a decarburized layer in a surface layer part of a steel sheet before heating of the steel sheet prior to hot pressing and subsequent cooling through a series of processes of hot pressing. Accordingly, the hardness distribution of the sheet surface becomes uniform, and the delayed fracture resistance is improved. To obtain this effect, the Sb content is preferably 0.001% or more. On the other hand, if Sb is added in excess of 0.020%, the rolling load increases and the productivity decreases. Therefore, the Sb content is preferably 0.020% or less.

Ca: 0.005% or Less, Mg: 0.005% or Less, REM: 0.005% or Less

Ca, Mg, and REM control the shapes of sulfides and oxides, and suppress the formation of coarse inclusions, thereby improving the delayed fracture resistance. To obtain this effect, it is preferable to add each element in an amount of 0.0005% or more. However, excessive addition causes an increase in inclusions and deterioration of the delayed fracture resistance. Therefore, the content of each added element is preferably 0.005% or less. Here, REM is an element containing Sc, Y, and lanthanoid elements.

V: 0.15% or Less

V is an element that contributes to the increase in strength by forming a fine carbonitride. To obtain this effect, the V content is preferably 0.01% or more. On the other hand, since adding a large amount of V lowers the toughness at the time of resistance spot welding and reduces the cross tensile strength. Therefore, the V content is preferably 0.15% or less.

Cu: 0.50% or Less

Cu can be added as needed because not only does it contribute to the increase in strength by solid solution strengthening, but it improves the corrosion resistance and thus can improve the delayed fracture resistance. To obtain these effects, the Cu content is preferably 0.05% or more. On the other hand, if Cu is added in excess of 0.50%, the effect is saturated and surface defects resulting from Cu tend to occur more frequently. Therefore, the Cu content is preferably 0.50% or less.

Ni: 0.50% or Less

Similarly to Cu, Ni can also be added as needed because it can improve the delayed fracture resistance by improving the corrosion resistance. Moreover, when added simultaneously with Cu, Ni has the effect of suppressing surface defects caused by Cu. Thus, when Cu is added, addition of Ni is effective. To obtain these effects, the Ni content is 0.05% or more. However, since adding a large amount of Ni lowers the toughness at the time of resistance welding and reduces the cross tensile strength. Therefore, the Ni content is preferably 0.50% or less.

Sn: 0.50% or Less

Similarly to Cu and Ni, Sn can also be added as needed because it can improve the delayed fracture resistance by improving the corrosion resistance. To obtain these effects, the Sn content is 0.05% or more. However, the addition of a large amount of Sn lowers the toughness at the time of resistance welding and reduces the improvement of the delayed fracture resistance and the cross tensile strength after resistance spot welding. Therefore, the Sn content is preferably 0.50% or less.

Zn: 0.10% or Less

Zn is an element that contributes to the formation of martensite after hot pressing, and thus contributes to the formation of martensite after hot pressing, that is, the increase in strength. To obtain these effects, the Zn content is preferably 0.005% or more. However, the addition of a large amount of Zn lowers the toughness at the time of resistance welding and reduces the cross tensile strength. Therefore, the Zn content is preferably 0.10% or less.

Co: 0.10% or Less

Similarly to Cu and Ni, Co can also be added as needed because it can improve the delayed fracture resistance as it increases the corrosion resistance by improving the hydrogen overvoltage. To obtain these effects, the Co content is preferably 0.005% or more. However, the addition of a large amount of Co lowers the toughness at the time of resistance welding and reduces the cross tensile strength. Therefore, the Co content is preferably 0.10% or less.

Zr: 0.10% or Less

Similarly to Cu and Ni, Zr can also be added as needed because it can improve the delayed fracture resistance by improving the corrosion resistance. To obtain these effects, the Zr content is preferably 0.005% or more. However, the addition of a large amount of Zr lowers the toughness at the time of resistance welding and reduces the cross tensile strength. Therefore, the Zr content is preferably 0.10% or less.

Ta: 0.10% or Less

Ta, like Ti, forms alloy carbides and alloy nitrides and contributes to the increase in strength. To obtain this effect, the Ta content is preferably 0.005% or more. Excessively adding Ta, however, fails to increase the addition effect, but instead results in a rise in alloying cost. Therefore, the Ta content is preferably 0.10% or less.

W: 0.10% or Less

Similarly to Cu and Ni, W can also be added as needed since it can improve the delayed fracture resistance by improving the corrosion resistance. To obtain these effects, the W content is preferably 0.005% or more. However, since adding a large amount of W lowers the toughness at the time of resistance welding and reduces the cross tensile strength. Therefore, the W content is preferably 0.10% or less.

The balance other than the above is Fe and inevitable impurities.

Next, the cold-rolled steel sheet for hot pressing and the coating or plating layer of the hot-pressed member according to the present disclosure will be described in detail.

[Coating or Plating Layer of Cold-Rolled Steel Sheet for Hot Pressing]

The cold-rolled steel sheet for hot pressing disclosed herein may be a cold-rolled steel sheet to which a coating or plating layer is not applied, yet in order to prevent oxidation by hot pressing or to improve corrosion resistance, a coating or plating layer may be applied onto the surface of the cold-rolled steel sheet before being subjected to hot pressing.

As a coating or plating layer to be applied onto the surface of the cold-rolled steel sheet for hot pressing according to the present disclosure, an Al or Al alloy coating or plating layer or a Zn or Zn alloy coating or plating layer is suitable. Applying such coating or plating layer onto the surface of the cold-rolled steel sheet for hot pressing prevents oxidation of the surface of the steel sheet by hot pressing, and the corrosion resistance of the hot-pressed member is further improved.

Examples of the Al or Al alloy coating or plating layer include an Al—Si coating layer formed by hot dip coating. In addition, examples of the Zn or Zn alloy coating or plating layer include a hot-dip galvanizing layer formed by hot dip coating, a galvannealing layer formed by alloying it, a Zn electroplating layer formed by electroplating, and a Zn—Ni alloy electroplating layer.

However, the Al or Al alloy coating or plating layer or the Zn or Zn alloy coating or plating layer is not limited to the above-described coating or plating layers, and may be a coating or plating layer which contains at least one of Si, Mg, Ni, Fe, Co, Mn, Sn, Pb, Be, B, P, S, Ti, V, W, Mo, Sb, Cd, Nb, Cr, and Sr in addition to the main component, Al or Zn. The method for forming the Al or Al alloy coating or plating layer or the Zn or Zn alloy coating or plating layer is not limited to the disclosed method at all, and any known hot dip coating, electroplating, vapor deposition plating, or the like is applicable. The Al or Al alloy coating or plating layer or the Zn or Zn alloy coating or plating layer may be a coating or plating layer subjected to an alloying treatment after the coating or plating step.

In the present disclosure, in particular, it is more preferable that the Zn or Zn alloy coating or plating layer is a Zn—Ni alloy coating or plating layer in order to further improve the corrosion resistance of the hot-pressed member or to prevent liquid metal embrittlement cracking caused by molten Zn during hot press forming.

The coating weight of the coating or plating layer is not particularly limited, and may be set in a general manner. For example, it is preferable to have a coating or plating layer with a coating weight of 5 $g/m^2$ to 150 $g/m^2$ per surface. If the coating weight is less than 5 $g/m^2$, it may be difficult to ensure corrosion resistance, while if it exceeds 150 $g/m^2$, the resistance to coating or plating exfoliation may deteriorate.

[Coating or Plating Layer of Hot-Pressed Member]

When a cold-rolled steel sheet for hot pressing to which an Al or Al alloy coating or plating layer or a Zn or Zn alloy coating or plating layer is applied is heated and then hot-pressed, some or all of the coating or plating layer components contained in the Al or Al alloy coating or plating layer or the Zn or Zn alloy coating or plating layer diffuse into the base steel sheet to form a solid solution phase or an intermetallic compound, and at the same time, conversely, Fe which is a component of the base steel sheet diffuses into the Al or Al alloy coating or plating layer or the Zn or Zn alloy coating or plating layer to form a solid solution phase or an intermetallic compound. Further, an oxide layer containing Al is formed on the surface of the Al or Al alloy coating of plating layer, and an oxide layer containing Zn is formed on the surface of the Zn or Zn alloy coating or plating layer.

As an example, when an Al—Si coating or plating layer is heated, it changes to a coating or plating layer mainly composed of an Fe—Al intermetallic compound containing Si. Further, when a hot-dip galvanizing layer, a galvannealing layer, a Zn electroplating layer, and the like are heated, an FeZn solid solution phase in which Zn is dissolved in Fe, a ZnFe intermetallic compound, a ZnO layer in the surface layer, and the like are formed. Furthermore, when the Zn—Ni alloy electroplating layer is heated, a solid solution layer containing Ni in which a coating or plating layer component is dissolved in Fe, an intermetallic compound mainly composed of ZnNi, a ZnO layer in the surface layer, and the like are formed.

As used herein, as described above, a coating or plating layer containing Al formed by heating a cold-rolled steel sheet for hot pressing to which an Al or Al alloy coating or plating layer is applied is referred to as an Al or Al alloy coating or plating layer, and a coating or plating layer containing Zn formed by heating a cold-rolled steel sheet for hot pressing to which a Zn or Zn alloy coating or plating layer is applied is referred to as a Zn or Zn alloy coating or plating layer.

Next, a preferred method for manufacturing the cold-rolled steel sheet for hot pressing according to the present disclosure will be described.

In the present disclosure, in the production of the above-described cold-rolled steel sheet, at first, a molten steel having the above-described predetermined chemical composition is subjected to continuous casting to obtain a slab, which in turn is cooled to 650° C. within 6 hours. Then, the slab is reheated and hot rolled under a set of conditions including a rolling reduction of 12% or more at a final pass of finish rolling, a rolling reduction of 15% or more at a pass immediately before the final pass, and a finisher delivery temperature of 860° C. to 950° C.

After the hot rolling, the hot-rolled steel sheet is subjected to primary cooling whereby the hot-rolled steel sheet is cooled to a cooling end temperature of 700° C. or lower at a first average cooling rate of 70° C./s or higher up to the cooling end temperature.

After the primary cooling, the steel sheet is subjected to secondary cooling whereby the steel sheet is coiled at a coiling temperature of 450° C. or lower at a second average cooling rate of 5° C./s to 50° C./s up to the coiling temperature.

Then, the coiled hot-rolled steel sheet is pickled, and then cold rolled to obtain a cold-rolled steel sheet. Then, the cold-rolled steel sheet is subjected to annealing whereby the cold-rolled steel sheet is heated to a temperature range of 700° C. to 830° C. at an average heating rate of 5° C./s to 20° C./s and subjected to 15 seconds to 600 seconds of soaking in the temperature range of 700° C. to 830° C.

After the soaking, the cold-rolled steel sheet is subjected to a tertiary cooling whereby the cold-rolled steel sheet is cooled to a cooling end temperature of 600° C. or lower at a third average cooling rate of 5° C./s or higher.

Hereinafter, the above manufacturing method will be described in detail for each step.

[Continuous Casting]

In the present disclosure, at first, a slab is cast by continuous casting. This is because the continuous casting is a premise based on the problem to be solved by the present disclosure, and the production efficiency is high compared to mold casting. As a continuous casting machine, a vertical bending type is desirable. The reason is that the vertical bending type is excellent in the balance between the equipment cost and the surface quality, and is remarkably effective in suppressing surface cracks.

[Slab Cooling]

The slab thus obtained through the continuous casting is then cooled to 650° C. within 6 hours. If cooling is performed to 650° C. for more than 6 hours after the continuous casting, segregation of Mn and the like becomes remarkable and crystal grains become coarse, the desired grain size can not be obtained in steel sheets after being subjected to cold rolling and members after being subjected to hot pressing. In addition, since Ti-based precipitates become coarse and such coarse Ti-based precipitates remain without being redisolved before hot rolling, the desired dispersion of Ti-based precipitates can not be obtained in cold-rolled steel sheets and members after being subjected to hot pressing. Although it is possible to dissolve the coarsened Ti-based precipitates by raising the hot rolling start temperature or prolonging the hot rolling time, the grain size becomes large on the other hand, and thus the desired grain size can not be obtained in steel sheets after being subjected to cold rolling and members after being subjected to hot pressing.

Therefore, this slab cooling is an important manufacturing step in the present disclosure, and cooling of the steel slab after continuous casting is up to 650° C. within 6 hours. Preferably, the steel slab is cooled to 650° C. within 5 hours, and more preferably to 650° C. within 4 hours. After being cooled to 650° C., the slab may be subsequently cooled to room temperature, reheated, and then hot rolled, or may be reheated as a warm slab and then subjected to hot rolling.

[Heating]

For a steel slab as a raw material after being cast, it is preferable to start hot rolling either at 1150° C. to 1270° C. directly after casting without reheating or after reheating to 1150° C. to 1270° C. Under preferred conditions for hot rolling, at first, a steel slab is hot rolled at a hot rolling start temperature of 1150° C. to 1270° C.

[Hot Rolling]

Rolling Reduction at a Final Pass of Finish Rolling: 12% or More

It is necessary to set the rolling reduction in the final pass of finish rolling to 12% or more from the perspectives of introducing a large number of shear bands into austenite grains, producing more nucleation sites during ferrite transformation after hot rolling to refine the crystal grains in the microstructure of the hot rolled sheet, and eliminating Mn bands. This setup is also effective in the refinement of grains in the microstructure of the surface layer. The rolling reduction at a final pass of finish rolling is preferably 13% or more. The upper limit of the rolling reduction is not particularly limited. However, when the hot rolling load is increased, the thickness variation in the width direction of the steel sheet increases, and the delayed fracture resistance may be degraded. Therefore, the upper limit is 30% or less.

Rolling Reduction at a Pass Immediately Before the Final Pass of Finish Rolling: 15% or More It is necessary to set the rolling reduction at a pass immediately before the final pass to 15% or more from the perspectives of further enhancing the strain accumulation effect such that a large number of shear bands are introduced into the austenite grains, producing even more nucleation sites during ferrite transformation to further refine the crystal grains in the microstructure of the hot rolled sheet, and further eliminating Mn bands. The rolling reduction at a pass immediately before the final pass of finish rolling is preferably 18% or more. The upper limit of the rolling reduction is not particularly limited. However, when the hot rolling load is increased, the thickness variation in the width direction of the steel sheet increases, and the delayed fracture resistance may be degraded. Therefore, the upper limit is 30% or less.

Finisher Delivery Temperature: 860° C. to 950° C.

The hot rolling needs to be finished in the austenite single phase region in order to improve the resistance to resistance welding cracking after annealing by increasing the uniformity of the microstructure of the steel sheet and reducing the anisotropy of the material property. Therefore, the finisher delivery temperature is 860° C. or higher. On the other hand, when the finisher delivery temperature exceeds 950° C., the hot-rolled microstructure becomes coarse, and the crystal grains after annealing are also coarsened. Therefore, the upper limit of the finisher delivery temperature is 950° C.

[Cooling after the Hot Rolling]

Primary Cooling: Cooling to 700° C. or Lower at a First Average Cooling Rate of 70° C./s or Higher The austenite undergoes ferrite transformation during the cooling process after the end of the hot rolling. However, since the ferrite coarsens at high temperatures, quenching is performed after the end of the hot rolling to homogenize the microstructure as much as possible, while at the same time suppressing generation of Ti-based precipitates. Accordingly, at first, as primary cooling, cooling is performed to 700° C. or lower at a first average cooling rate of 70° C./s or higher. If the first average cooling rate is lower than 70° C./s, the ferrite is coarsened, and the microstructure of the hot-rolled steel sheet becomes inhomogeneous, leading to a reduction in the delayed fracture resistance and the cross tensile strength after resistance spot welding. On the other hand, if the cooling end temperature in the primary cooling is higher than 700° C., pearlite is excessively formed in the microstructure of the hot-rolled steel sheet, and the microstructure of the steel sheet eventually becomes heterogeneous, again leading to a reduction in the delayed fracture resistance and the cross tensile strength after resistance spot welding. Moreover, the cooling end temperature in the primary cooling is in a range of 500° C. to 700° C.

Secondary Cooling: Cooling to 450° C. or Lower at a Second Average cooling rate of 5° C./s to 50° C./s If the average cooling rate in this secondary cooling is lower than 5° C./s, ferrite or pearlite is excessively formed in the microstructure of the hot-rolled steel sheet, and the microstructure of the steel sheet eventually becomes heterogeneous, and Ti-based precipitates coarsen, leading to a reduction in the delayed fracture resistance and the cross tensile strength after resistance spot welding. On the other hand, if the average cooling rate in the secondary cooling is higher than 50° C./s, pearlite is excessively formed in the microstructure of the hot-rolled steel sheet, and the element distribution of C becomes uneven, leading to a reduction in the delayed fracture resistance after hot pressing and the cross tensile strength after resistance spot welding. Furthermore, cooling to temperatures above 450° C. causes excessive formation of ferrite or pearlite in the microstructure of the hot-rolled steel sheet and coarsening of the Ti-based precipitates, again leading to a reduction in the delayed fracture resistance and the cross tensile strength after resistance spot welding.

Coiling Temperature: 450° C. or Lower

If the coiling temperature is higher than 450° C., ferrite and pearlite are excessively formed in the microstructure of the hot-rolled steel sheet, and the microstructure of the steel sheet eventually becomes heterogeneous, leading to a reduction in the delayed fracture resistance and the cross tensile strength after resistance spot welding. To avoid this, it is important to perform coiling with a bainite single phase. In addition, when coiling is performed at high temperature, Ti-based precipitates coarsen, and the delayed fracture resistance deteriorates. Therefore, in the present disclosure, the upper limit of the coiling temperature is 450° C. It is preferably 420° C. or lower. The lower limit of the coiling temperature is not particularly specified, yet if the coiling temperature is too low, hard martensite is excessively formed to increase the cold rolling load. Therefore, the lower limit is preferably 300° C. or higher.

[Pickling]

After the hot rolling, pickling is performed to remove scale from the surface of the hot-rolled sheet. The pickling treatment is not particularly limited and may be carried out according to a conventional method.

[Cold Rolling]

Cold rolling is performed to roll a steel sheet into a cold-rolled sheet having a predetermined thickness. The cold rolling is not particularly limited and may be carried out according to a conventional method.

[Annealing]

After being cold rolled, the steel sheet is heated to a temperature range of 700° C. to 830° C. at an average heating rate of 5° C./s to 20° C./s and subjected to 15 seconds to 600 seconds of soaking in the temperature range of 700° C. to 830° C.

The annealing is carried out to promote recrystallization after cold rolling and to control the microstructure of the member after being subjected to hot pressing, the distribution state of Ti-based precipitates, and Mn segregation on the surface.

In the annealing, excessively rapid heating makes it difficult for recrystallization to proceed, the upper limit of the average heating rate is set at 20° C./s. However, when the heating rate is too low, ferrite and martensite grains become coarsened, and a desired microstructure can not be obtained after hot pressing. Therefore, an average heating rate of 5° C./s or higher is required. It is preferably 8° C./s or higher. By controlling the average heating rate, it is possible to make the crystal grains finer.

Then, the steel sheet is heated to a soaking temperature range of 700° C. to 830° C. described later.

Soaking Temperature: 700° C. to 830° C.

The soaking temperature is set in a temperature range of a ferrite and austenite dual phase region. Below 700° C., the martensite fraction decreases, and C and Mn highly concentrate in austenite such that the desired precipitation state of cementite can not be obtained after hot pressing. Therefore, the lower limit of the soaking temperature is set at 700° C. On the other hand, if the soaking temperature is too high, crystal grain growth of austenite becomes remarkable, the crystal grains and Ti-based precipitates become coarse, and the delayed fracture resistance decreases. Therefore, the soaking temperature is 830° C. or lower. It is preferably 810° C. or lower.

Soaking Duration: 15 Seconds to 600 Seconds

In the above-described soaking temperature range, a holding time of at least 15 seconds is necessary for progress of recrystallization and austenite transformation of some or all of the microstructures. On the other hand, if the holding time is excessively long, microsegregation of Mn is promoted and bending workability is deteriorated. Therefore, the holding time is preferably 600 seconds or shorter.

[Cooling]

Cooling Conditions after Soaking: Cooling to a Temperature Range of 600° C. or Lower at a Third Average Cooling Rate of 5° C./s or Higher After the above-described soaking treatment (annealing treatment), it is necessary to perform cooling at an average cooling rate of 5° C./s or higher from the soaking temperature to a temperature range (cooling end temperature) of 600° C. or lower. If the average cooling rate is lower than 5° C./s, ferrite transformation proceeds during cooling, and the volume fraction of martensite in the cold-rolled steel sheet decreases and Ti-based precipitates become coarse, making it difficult to ensure the delayed fracture resistance. The upper limit of the average cooling rate is not particularly specified, yet is preferably 30° C./s or lower from the viewpoint of equipment and cost. In addition, when the cooling end temperature is higher than 600° C., pearlite is excessively formed, and a predetermined volume fraction in the microstructure of the steel sheet can not be obtained, causing deterioration of the delayed fracture resistance.

In the above-described series of manufacturing processes, particularly important in the present disclosure are the continuous casting, hot rolling (including the subsequent primary and secondary cooling steps), and annealing after the cold rolling (including the subsequent tertiary cooling step).

That is, by appropriately controlling the above-described continuous casting step, hot rolling step, and annealing step, crystal grains are refined, Mn segregation is eliminated, and the distribution state of Ti-based precipitates is improved. As a result, it is possible to obtain a microstructure which contains 5% to 45% by volume fraction of martensite having an average grain size of 4 µm or less, and at least 15 Ti-based precipitates having a grain size of less than 0.10 µm present on average per 100 µm² of a cross section parallel to the thickness direction of the steel sheet in a range of 100 µm in the thickness direction from the surface of the steel sheet.

Thereafter, the cold-rolled steel sheet may be subjected to a coating or plating treatment such as hot-dip galvanizing, or used as it is without being subjected to such treatment.

[Coating or Plating]

The cold-rolled steel sheet for hot pressing disclosed herein may be used as the cold-rolled steel sheet manufactured by the above-described manufacturing process or, depending on the purpose, may be subjected to an Al or Al alloy coating or plating treatment or a Zn or Zn alloy coating or plating treatment to form an Al or Al alloy coating or plating layer or a Zn or Zn alloy coating or plating layer.

Such coating or plating treatment is not limited at all, and any known hot-dip coating, electroplating, vapor deposition plating, and the like can be applied. In addition, after the coating or plating treatment, an alloying treatment may be performed. For typical coating or plating treatments, examples of the Al or Al alloy coating or plating treatment include a treatment to apply hot-dip aluminum (Al) coating and a treatment to apply hot-dip Al—Si coating, and examples of zinc or zinc alloy coating or plating treatment include a treatment to apply hot-dip galvanizing or zinc-nickel electroplating and a treatment to apply hot-dip galvanizing followed by an alloying treatment.

Temper rolling may also be carried out on the cold-rolled steel sheet. In this case, a preferred elongation ratio is 0.05% to 2.0%.

The cold-rolled steel sheet thus obtained is subjected to hot pressing to obtain a hot-pressed member. The hot pressing method at this time is not particularly limited and may be performed according to a conventional method. Although one example is given below, the present disclosure is not so limited. For example, a cold-rolled steel sheet for hot pressing as a raw material may be heated to a temperature range of an $Ac_3$ transformation temperature to 1000° C. using an electric furnace, a gas furnace, an electric heating furnace, a far infrared heating furnace, or the like, held in this temperature range for 0 seconds to 600 seconds, transported to a press, and subjected to hot pressing in a temperature range of 550° C. to 800° C. The heating rate at the time of heating the cold-rolled steel sheet for hot pressing may be 3° C./s to 200° C./s.

Here, the $Ac_3$ transformation temperature can be determined by:

$$Ac_3 \text{transformation temperature } (° C.)=881-206C+53Si-15Mn-20Ni-1Cr-27Cu+41Mo$$

Where each element symbol represents the content by mass % of the corresponding element. For any element not contained, it is calculated as zero.

EXAMPLES

The following describes examples according to the disclosure.

The present disclosure is by no means limited by the examples described below, and can be implemented with appropriate modifications without departing from the spirit of the present disclosure. All such modifications are encompassed by the technical scope of the present disclosure.

Steels having the chemical compositions listed in Table 1 were prepared by steelmaking and continuously cast into slabs under the conditions listed in Table 2, then heated to 1250° C., and then subjected to hot rolling under the conditions listed in Table 2 for the finisher delivery temperature (FDT). Then, each hot-rolled steel sheet was cooled to a cooling end temperature (first cooling temperature) at a first average cooling rate (Cooling Rate 1) listed in Table 2, then cooled to a coiling temperature (CT) at a second average cooling rate (Cooling Rate 2), and then wound in a coil form. Note that some samples were not subjected to a two-stage cooling step after being subjected to hot rolling, but cooled at a fixed speed, and wound in a coil form. Then, each hot-rolled sheet thus obtained was pickled, and then cold rolled with a rolling reduction listed in Table 2 to obtain a cold-rolled sheet (sheet thickness: 1.4 mm).

Then, each cold-rolled steel sheet thus obtained was subjected to annealing treatment under the conditions listed in Table 2 in a continuous annealing line (CAL) or a continuous galvanizing line (CGL), and cold-rolled steel sheets (CR) were obtained for those having passed through CAL and hot-dip galvanized steel sheets (GI) were obtained for those having passed through CGL. Note that some of the steel sheets having passed through CGL were subjected to a hot-dip galvanization treatment, followed by an alloying treatment at 550° C., to obtain galvannealed steel sheets (GA). In addition, a hot-dip aluminum coating treatment was performed to obtain a hot-dip aluminum coated steel sheet (AS). Furthermore, some were partially annealed in CAL, and zinc-nickel electroplated steel sheets (EZN) were obtained in an electrogalvanizing line (EGL).

Then, hot pressing was performed on the obtained cold-rolled steel sheets (including those subjected to coating or plating) under the conditions listed in Table 3.

The mold used in the hot pressing had a punch width of 70 mm, a punch shoulder radius of 4 mm, and a die shoulder radius of 4 mm, and the forming depth was 30 mm. Heating of each cold-rolled steel sheet was performed in the atmosphere using either an infrared heating furnace or an atmosphere heating furnace depending on the heating rate. In addition, cooling after pressing was performed by combining sandwiching of each steel sheet between the punch and the die with air cooling on the die released from the sandwiching, and each steel sheet was cooled from the press (start) temperature to 150° C. At this time, the cooling rate was adjusted by changing the holding time of the punch at the bottom dead center in a range of 1 second to 60 seconds.

A JIS No. 5 tensile test specimen was collected from the position of the hat bottom portion of each hot-pressed member thus obtained, and a tensile test was performed according to JIS Z 2241 to measure the tensile strength (TS).

Moreover, for delayed fracture resistance test, a JIS No. 5 tensile test specimen was sampled from the position of the hat bottom portion of each hot-pressed member, and subjected to a constant load test. Load was applied while immersing each test specimen in a solution of hydrochloric acid (pH=3.0) at room temperature to evaluate the presence or absence of fracture. Assuming that the load stress is 900 MPa and 1200 MPa, the delayed fracture resistance was judged as "Good" if fracture did not occur for 100 hours or more under both load stresses, "Fair" if fracture did not occur for 100 hours or more under the load stress of 900 MPa, but occurred in less than 100 hours under the load stress of 1200 MPa, or "Poor" if fracture occurred in less than 100 hours under both load stresses.

To determine the cross tensile strength after resistance spot welding, a 50 mm×150 mm cross tension test piece was cut out in accordance with the cross tension testing (JIS Z 3137) and subjected to resistance welding. The resistance welding was performed by resistance spot welding using a resistance welding machine of servomotor pressure type at single phase direct current (50 Hz) attached to a welding gun, and a tension test piece having a resistance welding portion was prepared. Note that the pair of electrode chips used was a DR-type electrode pair of alumina-dispersed copper having a radius of curvature R of 40 mm at the tip and a tip diameter of 6 mm. The welding conditions were such that the applied pressure was 4500 N, the conduction time was 19 cycles (50 Hz), the hold time was 1 cycle (50 Hz), and the welding current was adjusted so that the nugget diameter was 6.1 mm. The cross tensile strength after resistance spot welding was judged as "Good" if the cross tensile strength was 6.5 kN or more, "Fair" if the cross tensile strength was 5 kN or more, or "Poor" if the cross tensile strength was less than 5 kN.

To determine the volume fraction of martensite of the cold-rolled steel sheet after being annealed and the member after being subjected to hot pressing, a cross section parallel to the rolling direction and the thickness direction of the steel sheet was polished, treated by corrosion with 3 vol % nital, and observed under a scanning electron microscope (SEM) at 5000 times magnification, and the area ratio was measured by a point count method (in accordance with ASTM E562-83 (1988)), and the measured area ratio was used as the volume fraction. Using Image-Pro available from Media Cybernetics, micrographs in which crystal grains of prior austenite, ferrite, and martensite had been respectively identified in advance were captured from the microstructural micrographs of each steel sheet (taken at 10 locations of 20 μm×20 μm at 5000 times magnification) to determine the area of each crystal grain. The equivalent circular diameter of each crystal grain was calculated, the results were averaged, and the average was used as the area of each crystal grain.

Further, for both cold-rolled steel sheets and pressed members, to determine the grain size of Ti-based precipitates and cementite grains, a cross section parallel to the thickness direction was observed at 10 locations of 0.5 μm×0.5 μm under a transmission electron microscope (TEM) at 10000 times magnification, and the equivalent circle diameter was calculated using Image-Pro available from Media Cybernetics with a lower limit of 0.005 to determine the grain size. To determine the number of Ti-based precipitates having a grain size of less than 0.10 μm and the number of cementite grains having a grain size of 0.05 μm or more, the cross section was observed at 10 locations of 0.5 μm×0.5 μm under a transmission electron microscope (TEM) at 10000 times magnification, and the average number density of these 10 locations was obtained. In this method, it was possible to count Ti-based precipitates having a grain size of 0.005 μm or more.

The microstructures of the cold-rolled steel sheets and the hot-pressed members thus obtained are listed in Table 4. In addition, Table 5 lists the measurement results of the tensile properties, the delayed fracture resistance, and the cross tensile strength after resistance spot welding of the hot-pressed members.

TABLE 1

| Steel ID | Chemical composition (mass %) | | | | | | | | | | | Expression (1) | $Ac_3$ transformation temp. (° C.) |
|---|---|---|---|---|---|---|---|---|---|---|---|---|---|
| | C | Si | Mn | P | S | Al | N | Ti | Cr | Mo | Others | | |
| A | 0.31 | 0.25 | 1.77 | 0.01 | 0.001 | 0.03 | 0.002 | 0.022 | 0.20 | 0.00 | — | 23.2 | 804 |
| B | 0.34 | 1.24 | 1.69 | 0.01 | 0.002 | 0.02 | 0.003 | 0.045 | 0.00 | 0.13 | Nb: 0.02, V: 0.01 | 16.5 | 857 |
| C | 0.38 | 0.41 | 1.45 | 0.02 | 0.002 | 0.03 | 0.002 | 0.019 | 0.15 | 0.14 | B: 0.002, Sb: 0.008 | 24.2 | 808 |
| D | 0.29 | 0.33 | 2.21 | 0.02 | 0.002 | 0.03 | 0.002 | 0.032 | 0.00 | 0.22 | Cu: 0.22, N: 0.11 | 24.0 | 806 |
| E | 0.32 | 0.09 | 1.49 | 0.01 | 0.003 | 0.02 | 0.002 | 0.059 | 0.00 | 0.19 | Sn: 0.02, Zn:0.01, Co: 0.03 | 11.3 | 805 |
| F | 0.34 | 0.22 | 2.11 | 0.02 | 0.002 | 0.04 | 0.003 | 0.025 | 0.18 | 0.00 | Zr: 0.01, Ta: 0.02, W: 0.02 | 27.3 | 791 |
| G | 0.30 | 0.54 | 1.54 | 0.02 | 0.002 | 0.03 | 0.003 | 0.019 | 0.25 | 0.00 | Ca: 0.001, Mg: 0.001, REM: 0.001 | 22.7 | 824 |
| H | 0.24 | 0.25 | 1.54 | 0.01 | 0.001 | 0.03 | 0.003 | 0.018 | 0.20 | 0.00 | — | 22.2 | 822 |
| I | 0.48 | 0.02 | 2.20 | 0.01 | 0.001 | 0.03 | 0.002 | 0.035 | 0.00 | 0.23 | — | 24.2 | 760 |
| J | 0.31 | 0.43 | 0.50 | 0.01 | 0.001 | 0.03 | 0.002 | 0.041 | 0.22 | 0.00 | — | 8.4 | 832 |

TABLE 1-continued

| Steel ID | Chemical composition (mass %) | | | | | | | | | | | Expression (1) | Ac₃ transformation temp. (° C.) |
|---|---|---|---|---|---|---|---|---|---|---|---|---|---|
| | C | Si | Mn | P | S | Al | N | Ti | Cr | Mo | Others | | |
| K | 0.33 | 0.19 | 3.84 | 0.01 | 0.001 | 0.02 | 0.002 | 0.015 | 0.22 | 0.00 | — | 47.2 | 765 |
| L | 0.37 | 0.21 | 1.33 | 0.03 | 0.001 | 0.02 | 0.003 | 0.000 | 0.25 | 0.33 | — | 27.0 | 809 |
| M | 0.35 | 0.22 | 1.84 | 0.03 | 0.001 | 0.02 | 0.003 | 0.031 | 0.19 | 0.00 | Nb: 0.01, B: 0.002, Sb: 0.01 | 23.2 | 793 |

Expression (1): $(6C + 2Mn + 49P)/(Cr/2 + Mo/3 + 7Ti)$

TABLE 2

| Specimen No. | Steel ID | Continuous casting Cooling time up to 650° C. h | Hot rolling Rolling reduction at a pass immediately before the final pass % | Rolling reduction at final pass % | FDT ° C. | Cooling rate 1 ° C./s | First cooling temp. ° C. | Cooling rate 2 ° C./s | CT ° C. | Rolling reduction in cold rolling % | Annealing Average heating rate ° C./s | Soaking temp. ° C. | Holding time s | Cooling rate 3 ° C./s | Cooling end temp. ° C. | Coating or plating | Remarks |
|---|---|---|---|---|---|---|---|---|---|---|---|---|---|---|---|---|---|
| 1 | A | 5 | 18 | 15 | 900 | 100 | 640 | 20 | 430 | 50 | 10 | 760 | 180 | 7 | 525 | GA | Example |
| 2 | B | 5 | 18 | 15 | 900 | 100 | 640 | 20 | 430 | 50 | 10 | 760 | 180 | 7 | 525 | GA | Example |
| 3 | C | 5 | 18 | 15 | 900 | 100 | 640 | 20 | 430 | 50 | 10 | 760 | 180 | 7 | 525 | GA | Example |
| 4 | D | 5 | 18 | 15 | 900 | 100 | 640 | 20 | 430 | 50 | 10 | 760 | 180 | 7 | 525 | GA | Example |
| 5 | E | 5 | 18 | 15 | 900 | 100 | 640 | 20 | 430 | 50 | 10 | 760 | 180 | 7 | 525 | GA | Example |
| 6 | F | 5 | 18 | 15 | 900 | 100 | 640 | 20 | 430 | 50 | 10 | 760 | 180 | 7 | 525 | GA | Example |
| 7 | G | 5 | 18 | 15 | 900 | 100 | 640 | 20 | 430 | 50 | 10 | 760 | 180 | 7 | 525 | GA | Example |
| 8 | A | 3 | 18 | 15 | 900 | 100 | 640 | 20 | 430 | 50 | 10 | 760 | 180 | 7 | 525 | GA | Example |
| 9 | A | 5 | 15 | 15 | 900 | 100 | 640 | 20 | 430 | 50 | 10 | 760 | 180 | 7 | 525 | GA | Example |
| 10 | A | 5 | 18 | 12 | 900 | 100 | 640 | 20 | 430 | 50 | 10 | 760 | 180 | 7 | 525 | GA | Example |
| 11 | A | 5 | 18 | 15 | 860 | 100 | 640 | 20 | 430 | 50 | 10 | 760 | 180 | 7 | 525 | GA | Example |
| 12 | A | 5 | 18 | 15 | 950 | 100 | 640 | 20 | 430 | 50 | 10 | 760 | 180 | 7 | 525 | GA | Example |
| 13 | A | 5 | 18 | 15 | 900 | 70 | 640 | 20 | 430 | 50 | 10 | 760 | 180 | 7 | 525 | GA | Example |
| 14 | A | 5 | 18 | 15 | 900 | 100 | 700 | 20 | 430 | 50 | 10 | 760 | 180 | 7 | 525 | GA | Example |
| 15 | A | 5 | 18 | 15 | 900 | 100 | 640 | 5 | 430 | 50 | 10 | 760 | 180 | 7 | 525 | GA | Example |
| 16 | A | 5 | 18 | 15 | 900 | 100 | 640 | 50 | 430 | 50 | 10 | 760 | 180 | 7 | 525 | GA | Example |
| 17 | A | 5 | 18 | 15 | 900 | 100 | 640 | 20 | 450 | 50 | 10 | 760 | 180 | 7 | 525 | GA | Example |
| 18 | A | 5 | 18 | 15 | 900 | 100 | 640 | 20 | 430 | 30 | 10 | 760 | 180 | 7 | 525 | GA | Example |
| 19 | A | 5 | 18 | 15 | 900 | 100 | 640 | 20 | 430 | 70 | 10 | 760 | 180 | 7 | 525 | GA | Example |
| 20 | A | 5 | 18 | 15 | 900 | 100 | 640 | 20 | 430 | 50 | 5 | 760 | 180 | 7 | 525 | GA | Example |
| 21 | A | 5 | 18 | 15 | 900 | 100 | 640 | 20 | 430 | 50 | 20 | 760 | 180 | 7 | 525 | GA | Example |
| 22 | A | 5 | 18 | 15 | 900 | 100 | 640 | 20 | 430 | 50 | 10 | 720 | 180 | 7 | 525 | GA | Example |
| 23 | A | 5 | 18 | 15 | 900 | 100 | 640 | 20 | 430 | 50 | 10 | 830 | 180 | 7 | 525 | GA | Example |
| 24 | A | 5 | 18 | 15 | 900 | 100 | 640 | 20 | 430 | 50 | 10 | 760 | 15 | 7 | 525 | GA | Example |
| 25 | A | 5 | 18 | 15 | 900 | 100 | 640 | 20 | 430 | 50 | 10 | 760 | 600 | 7 | 525 | GA | Example |
| 26 | A | 5 | 18 | 15 | 900 | 100 | 640 | 20 | 430 | 50 | 10 | 760 | 180 | 5 | 525 | GA | Example |
| 27 | A | 5 | 18 | 15 | 900 | 100 | 640 | 20 | 430 | 50 | 10 | 760 | 180 | 30 | 525 | GA | Example |
| 28 | A | 5 | 18 | 15 | 900 | 100 | 640 | 20 | 430 | 50 | 10 | 760 | 180 | 7 | 600 | GA | Example |
| 29 | B | 5 | 18 | 15 | 900 | 100 | 640 | 20 | 430 | 50 | 10 | 760 | 180 | 7 | 525 | CR | Example |
| 30 | C | 5 | 18 | 15 | 900 | 100 | 640 | 20 | 430 | 50 | 10 | 760 | 180 | 7 | 525 | CR | Example |
| 31 | D | 5 | 18 | 15 | 900 | 100 | 640 | 20 | 430 | 50 | 10 | 760 | 180 | 7 | 525 | CR | Example |
| 32 | E | 5 | 18 | 15 | 900 | 100 | 640 | 20 | 430 | 50 | 10 | 760 | 180 | 7 | 525 | CR | Example |
| 33 | F | 5 | 18 | 15 | 900 | 100 | 640 | 20 | 430 | 50 | 10 | 760 | 180 | 7 | 525 | CR | Example |
| 34 | G | 5 | 18 | 15 | 900 | 100 | 640 | 20 | 430 | 50 | 10 | 760 | 180 | 7 | 525 | CR | Example |
| 35 | A | 5 | 18 | 15 | 900 | 100 | 640 | 20 | 430 | 50 | 10 | 760 | 180 | 7 | 525 | CR | Example |
| 36 | A | 5 | 18 | 15 | 900 | 100 | 640 | 20 | 430 | 50 | 10 | 760 | 180 | 7 | 525 | AS | Example |
| 37 | B | 5 | 18 | 15 | 900 | 100 | 640 | 20 | 430 | 50 | 10 | 760 | 180 | 7 | 525 | AS | Example |
| 38 | C | 5 | 18 | 15 | 900 | 100 | 640 | 20 | 430 | 50 | 10 | 760 | 180 | 7 | 525 | AS | Example |
| 39 | D | 5 | 18 | 15 | 900 | 100 | 640 | 20 | 430 | 50 | 10 | 760 | 180 | 7 | 525 | AS | Example |
| 40 | E | 5 | 18 | 15 | 900 | 100 | 640 | 20 | 430 | 50 | 10 | 760 | 180 | 7 | 525 | AS | Example |
| 41 | F | 5 | 18 | 15 | 900 | 100 | 640 | 20 | 430 | 50 | 10 | 760 | 180 | 7 | 525 | AS | Example |
| 42 | G | 5 | 18 | 15 | 900 | 100 | 640 | 20 | 430 | 50 | 10 | 760 | 180 | 7 | 525 | AS | Example |

TABLE 2-continued

| Specimen No. | Steel ID | Continous casting Cooling time up to 650° C. h | Hot rolling Rolling reduction at a pass immediately before the final pass % | Rolling reduction at final pass % | FDT °C. | Cooling rate 1 °C./s | First cooling temp. °C. | Cooling rate 2 °C./s | CT °C. | Rolling reduction in cold rolling % | Annealing Average heating rate °C./s | Soaking temp. °C. | Holding time s | Cooling rate 3 °C./s | Cooking end temp. °C. | Coating or plating | Remarks |
|---|---|---|---|---|---|---|---|---|---|---|---|---|---|---|---|---|---|
| 43 | A | 5 | 18 | 15 | 900 | 100 | 640 | 20 | 430 | 50 | 10 | 760 | 180 | 7 | 525 | GI | Example |
| 44 | B | 5 | 18 | 15 | 900 | 100 | 640 | 20 | 430 | 50 | 10 | 760 | 180 | 7 | 525 | GI | Example |
| 45 | C | 5 | 18 | 15 | 900 | 100 | 640 | 20 | 430 | 50 | 10 | 760 | 180 | 7 | 525 | GI | Example |
| 46 | D | 5 | 18 | 15 | 900 | 100 | 640 | 20 | 430 | 50 | 10 | 760 | 180 | 7 | 525 | GI | Example |
| 47 | E | 5 | 18 | 15 | 900 | 100 | 640 | 20 | 430 | 50 | 10 | 760 | 180 | 7 | 525 | GI | Example |
| 48 | F | 5 | 18 | 15 | 900 | 100 | 640 | 20 | 430 | 50 | 10 | 760 | 180 | 7 | 525 | GI | Example |
| 49 | G | 5 | 18 | 15 | 900 | 100 | 640 | 20 | 430 | 50 | 10 | 760 | 180 | 7 | 525 | GI | Example |
| 50 | A | 5 | 18 | 15 | 900 | 100 | 640 | 20 | 430 | 50 | 10 | 760 | 180 | 7 | 525 | EZN | Example |
| 51 | B | 5 | 18 | 15 | 900 | 100 | 640 | 20 | 430 | 50 | 10 | 760 | 180 | 7 | 525 | EZN | Example |
| 52 | C | 5 | 18 | 15 | 900 | 100 | 640 | 20 | 430 | 50 | 10 | 760 | 180 | 7 | 525 | EZN | Example |
| 53 | D | 5 | 18 | 15 | 900 | 100 | 640 | 20 | 430 | 50 | 10 | 760 | 180 | 7 | 525 | EZN | Example |
| 54 | E | 5 | 18 | 15 | 900 | 100 | 640 | 20 | 430 | 50 | 10 | 760 | 180 | 7 | 525 | EZN | Example |
| 55 | F | 5 | 18 | 15 | 900 | 100 | 640 | 20 | 430 | 50 | 10 | 760 | 180 | 7 | 525 | EZN | Example |
| 56 | G | 5 | 18 | 15 | 900 | 100 | 640 | 20 | 430 | 50 | 10 | 760 | 180 | 7 | 525 | GA | Example |
| 57 | A | 5 | 18 | 15 | 900 | 100 | 640 | 20 | 430 | 50 | 10 | 760 | 180 | 7 | 525 | GA | Example |
| 58 | B | 5 | 18 | 15 | 900 | 100 | 640 | 20 | 430 | 50 | 10 | 760 | 180 | 7 | 525 | GA | Example |
| 59 | C | 5 | 18 | 15 | 900 | 100 | 640 | 20 | 430 | 50 | 10 | 760 | 180 | 7 | 525 | GA | Example |
| 60 | D | 5 | 18 | 15 | 900 | 100 | 640 | 20 | 430 | 50 | 10 | 760 | 180 | 7 | 525 | GA | Example |
| 61 | E | 5 | 18 | 15 | 900 | 100 | 640 | 20 | 430 | 50 | 10 | 760 | 180 | 7 | 525 | GA | Example |
| 62 | F | 5 | 18 | 15 | 900 | 100 | 640 | 20 | 430 | 50 | 10 | 760 | 180 | 7 | 525 | GA | Example |
| 63 | G | 5 | 18 | 15 | 900 | 100 | 640 | 20 | 430 | 50 | 10 | 760 | 180 | 7 | 525 | GA | Example |
| 64 | A | 5 | 18 | 15 | 900 | 100 | 640 | 20 | 430 | 50 | 10 | 760 | 180 | 7 | 525 | GA | Example |
| 65 | A | 5 | 18 | 15 | 900 | 100 | 640 | 20 | 430 | 50 | 10 | 760 | 180 | 7 | 525 | GA | Example |
| 66 | A | 5 | 18 | 15 | 900 | 100 | 640 | 20 | 430 | 50 | 10 | 760 | 180 | 7 | 525 | GA | Example |
| 67 | A | 5 | 18 | 15 | 900 | 100 | 640 | 20 | 430 | 50 | 10 | 760 | 180 | 7 | 525 | GA | Example |
| 68 | A | 5 | 18 | 15 | 900 | 100 | 640 | 20 | 430 | 50 | 10 | 760 | 180 | 7 | 525 | GA | Example |
| 69 | A | 5 | 18 | 15 | 900 | 100 | 640 | 20 | 430 | 50 | 10 | 760 | 180 | 7 | 525 | GA | Example |
| 70 | A | 5 | 18 | 15 | 900 | 100 | 640 | 20 | 430 | 50 | 10 | 760 | 180 | 7 | 525 | GA | Example |
| 71 | A | 5 | 18 | 15 | 900 | 100 | 640 | 20 | 430 | 50 | 10 | 760 | 180 | 7 | 525 | GA | Example |
| 72 | A | 5 | 18 | 15 | 900 | 100 | 640 | 20 | 430 | 50 | 10 | 760 | 180 | 7 | 525 | GA | Example |
| 73 | A | 5 | 18 | 15 | 900 | 100 | 640 | 20 | 430 | 50 | 10 | 780 | 180 | 7 | 525 | GA | Example |
| 74 | A | 5 | 18 | 15 | 900 | 100 | 640 | 20 | 430 | 50 | 10 | 780 | 180 | 7 | 525 | GA | Example |
| 75 | A | 10 | 18 | 15 | 900 | 100 | 640 | 20 | 430 | 50 | 10 | 800 | 300 | 12 | 525 | GA | Comparative example |
| 76 | A | 5 | 5 | 5 | 900 | 100 | 640 | 20 | 430 | 50 | 10 | 800 | 200 | 12 | 525 | CR | Comparative example |
| 77 | A | 5 | 18 | 15 | 900 | 30 | 650 | 20 | 430 | 50 | 10 | 800 | 300 | 12 | 525 | CR | Comparative example |
| 78 | A | 5 | 18 | 15 | 900 | 100 | 770 | 20 | 430 | 50 | 10 | 800 | 180 | 12 | 525 | GA | Comparative example |
| 79 | A | 5 | 18 | 15 | 900 | 100 | 640 | 2 | 430 | 50 | 10 | 800 | 300 | 12 | 525 | GA | Comparative example |
| 80 | A | 5 | 18 | 15 | 900 | 100 | 640 | 20 | 700 | 50 | 10 | 800 | 300 | 12 | 525 | GA | Comparative example |
| 81 | A | 5 | 18 | 15 | 900 | 100 | 640 | 20 | 430 | 50 | 1 | 800 | 300 | 12 | 525 | GA | Comparative example |
| 82 | B | 5 | 18 | 15 | 900 | 100 | 640 | 20 | 430 | 50 | 10 | 600 | 180 | 12 | 525 | GA | Comparative example |
| 83 | B | 5 | 18 | 15 | 900 | 100 | 640 | 20 | 430 | 50 | 10 | 950 | 180 | 12 | 525 | CR | Comparative example |
| 84 | B | 5 | 18 | 15 | 900 | 100 | 640 | 20 | 430 | 50 | 10 | 760 | 2 | 12 | 525 | GA | Comparative example |
| 85 | B | 5 | 18 | 15 | 900 | 100 | 640 | 20 | 430 | 50 | 10 | 760 | 180 | 1 | 525 | CR | Comparative example |
| 86 | B | 5 | 18 | 15 | 900 | 100 | 640 | 20 | 430 | 50 | 10 | 760 | 180 | 7 | 700 | GA | Comparative example |

TABLE 2-continued

| | Continous casting | Rolling reduction | Hot rolling | | | | | | Rolling | Annealing | | | | | | |
|---|---|---|---|---|---|---|---|---|---|---|---|---|---|---|---|---|
| Specimen No. | Steel ID | Cooling time up to 650° C. h | at a pass immediately before the final pass % | Rolling reduction at final pass % | FDT °C. | Cooling rate 1 °C./s | First cooling temp. °C. | Cooling rate 2 °C./s | CT °C. | reduction in cold rolling % | Average heating rate °C./s | Soaking temp. °C. | Holding time s | Cooling rate 3 °C./s | Cooking end temp. °C. | Coating or plating | Remarks |
| 87 | H | 5 | 18 | 15 | 900 | 100 | 640 | 20 | 430 | 50 | 10 | 760 | 180 | 7 | 525 | GA | Comparative example |
| 88 | I | 5 | 18 | 15 | 900 | 100 | 640 | 20 | 430 | 50 | 10 | 760 | 180 | 7 | 525 | GA | Comparative example |
| 89 | J | 5 | 18 | 15 | 900 | 100 | 640 | 20 | 430 | 50 | 10 | 760 | 180 | 7 | 525 | GA | Comparative example |
| 90 | J | 4 | 18 | 15 | 900 | 100 | 640 | 25 | 400 | 50 | 10 | 740 | 120 | 15 | 525 | GA | Example |
| 91 | K | 5 | 18 | 15 | 900 | 100 | 640 | 20 | 430 | 50 | 10 | 760 | 180 | 7 | 525 | GA | Example |
| 92 | L | 5 | 18 | 15 | 900 | 100 | 640 | 20 | 430 | 50 | 10 | 760 | 180 | 7 | 525 | GA | Comparative example |
| 93 | M | 5 | 18 | 15 | 900 | 100 | 640 | 20 | 430 | 50 | 10 | 760 | 180 | 7 | 525 | GA | Comparative example |
| 94 | B | 5 | 18 | 15 | 900 | Cooling rate: 20° C./s | | | 430 | 50 | 10 | 760 | 180 | 7 | 525 | GA | Comparative example |
| 95 | A | 5 | 18 | 15 | 900 | Cooling rate: 20° C./s | | | 430 | 50 | 10 | 760 | 180 | 7 | 525 | GA | Comparative example |

TABLE 3

| Specimen No. | Steel ID | Hot pressing | | | | | Remarks |
| | | Heating rate °C./s | Heating temp. °C. | Holding time s | Hot pressing temp. °C. | Cooling rate up to 150° C. °C./s | |
| --- | --- | --- | --- | --- | --- | --- | --- |
| 1 | A | 5 | 900 | 60 | 700 | 100 | Example |
| 2 | B | 5 | 900 | 60 | 700 | 100 | Example |
| 3 | C | 5 | 900 | 60 | 700 | 100 | Example |
| 4 | D | 5 | 900 | 60 | 700 | 100 | Example |
| 5 | E | 5 | 900 | 60 | 700 | 100 | Example |
| 6 | F | 5 | 900 | 60 | 700 | 100 | Example |
| 7 | G | 5 | 900 | 60 | 700 | 100 | Example |
| 8 | A | 5 | 900 | 60 | 700 | 100 | Example |
| 9 | A | 5 | 900 | 60 | 700 | 100 | Example |
| 10 | A | 5 | 900 | 60 | 700 | 100 | Example |
| 11 | A | 5 | 900 | 60 | 700 | 100 | Example |
| 12 | A | 5 | 900 | 60 | 700 | 100 | Example |
| 13 | A | 5 | 900 | 60 | 700 | 100 | Example |
| 14 | A | 5 | 900 | 60 | 700 | 100 | Example |
| 15 | A | 5 | 900 | 60 | 700 | 100 | Example |
| 16 | A | 5 | 900 | 60 | 700 | 100 | Example |
| 17 | A | 5 | 900 | 60 | 700 | 100 | Example |
| 18 | A | 5 | 900 | 60 | 700 | 100 | Example |
| 19 | A | 5 | 900 | 60 | 700 | 100 | Example |
| 20 | A | 5 | 900 | 60 | 700 | 100 | Example |
| 21 | A | 5 | 900 | 60 | 700 | 100 | Example |
| 22 | A | 5 | 900 | 60 | 700 | 100 | Example |
| 23 | A | 5 | 900 | 60 | 700 | 100 | Example |
| 24 | A | 5 | 900 | 60 | 700 | 100 | Example |
| 25 | A | 5 | 900 | 60 | 700 | 100 | Example |
| 26 | A | 5 | 900 | 60 | 700 | 100 | Example |
| 27 | A | 5 | 900 | 60 | 700 | 100 | Example |
| 28 | A | 5 | 900 | 60 | 700 | 100 | Example |
| 29 | A | 5 | 900 | 60 | 700 | 100 | Example |
| 30 | B | 5 | 900 | 60 | 700 | 100 | Example |
| 31 | C | 5 | 900 | 60 | 700 | 100 | Example |
| 32 | D | 5 | 900 | 60 | 700 | 100 | Example |
| 33 | E | 5 | 900 | 60 | 700 | 100 | Example |
| 34 | F | 5 | 900 | 60 | 700 | 100 | Example |
| 35 | G | 5 | 900 | 60 | 700 | 100 | Example |
| 36 | A | 5 | 900 | 60 | 700 | 100 | Example |
| 37 | B | 5 | 900 | 60 | 700 | 100 | Example |
| 38 | C | 5 | 900 | 60 | 700 | 100 | Example |
| 39 | D | 5 | 900 | 60 | 700 | 100 | Example |
| 40 | E | 5 | 900 | 60 | 700 | 100 | Example |
| 41 | F | 5 | 900 | 60 | 700 | 100 | Example |
| 42 | G | 5 | 900 | 60 | 700 | 100 | Example |
| 43 | A | 5 | 900 | 60 | 700 | 100 | Example |
| 44 | B | 5 | 900 | 60 | 700 | 100 | Example |
| 45 | C | 5 | 900 | 60 | 700 | 100 | Example |
| 46 | D | 5 | 900 | 60 | 700 | 100 | Example |
| 47 | E | 5 | 900 | 60 | 700 | 100 | Example |
| 48 | F | 5 | 900 | 60 | 700 | 100 | Example |
| 49 | G | 5 | 900 | 60 | 700 | 100 | Example |
| 50 | A | 5 | 900 | 60 | 700 | 100 | Example |
| 51 | B | 5 | 900 | 60 | 700 | 100 | Example |
| 52 | C | 5 | 900 | 60 | 700 | 100 | Example |
| 53 | D | 5 | 900 | 60 | 700 | 100 | Example |
| 54 | E | 5 | 900 | 60 | 700 | 100 | Example |
| 55 | F | 5 | 900 | 60 | 700 | 100 | Example |
| 56 | G | 5 | 900 | 60 | 700 | 100 | Example |
| 57 | A | 5 | 900 | 60 | 700 | 100 | Example |
| 58 | B | 5 | 900 | 60 | 700 | 100 | Example |
| 59 | C | 5 | 900 | 60 | 700 | 100 | Example |
| 60 | D | 5 | 900 | 60 | 700 | 100 | Example |
| 61 | E | 5 | 900 | 60 | 700 | 100 | Example |
| 62 | F | 5 | 900 | 60 | 700 | 100 | Example |
| 63 | G | 5 | 900 | 60 | 700 | 100 | Example |
| 64 | A | 3 | 900 | 60 | 700 | 100 | Example |
| 65 | A | 90 | 900 | 60 | 700 | 100 | Example |
| 66 | A | 180 | 900 | 60 | 700 | 100 | Example |
| 67 | A | 5 | 830 | 60 | 700 | 100 | Example |
| 68 | A | 5 | 950 | 60 | 700 | 100 | Example |
| 69 | A | 5 | 900 | 5 | 700 | 100 | Example |
| 70 | A | 5 | 900 | 300 | 700 | 100 | Example |
| 71 | A | 5 | 900 | 60 | 650 | 100 | Example |
| 72 | A | 5 | 900 | 60 | 750 | 100 | Example |
| 73 | A | 5 | 900 | 60 | 700 | 50 | Example |
| 74 | A | 5 | 900 | 60 | 700 | 300 | Example |

TABLE 3-continued

| | | Hot pressing | | | | | |
|---|---|---|---|---|---|---|---|
| Specimen No. | Steel ID | Heating rate °C./s | Heating temp. °C. | Holding time s | Hot pressing temp. °C. | Cooling rate up to 150° C. °C./s | Remarks |
| 75 | A | 50 | 900 | 300 | 700 | 300 | Comparative example |
| 76 | A | 20 | 900 | 20 | 700 | 300 | Comparative example |
| 77 | A | 20 | 900 | 20 | 700 | 300 | Comparative example |
| 78 | A | 20 | 900 | 20 | 700 | 300 | Comparative example |
| 79 | A | 20 | 900 | 20 | 700 | 300 | Comparative example |
| 80 | A | 20 | 900 | 20 | 700 | 300 | Comparative example |
| 81 | A | 50 | 900 | 10 | 700 | 300 | Comparative example |
| 82 | B | 10 | 900 | 60 | 700 | 200 | Comparative example |
| 83 | B | 100 | 900 | 30 | 700 | 400 | Comparative example |
| 84 | B | 20 | 900 | 20 | 700 | 300 | Comparative example |
| 85 | B | 20 | 900 | 20 | 700 | 300 | Comparative example |
| 86 | B | 20 | 900 | 20 | 700 | 300 | Comparative example |
| 87 | H | 5 | 900 | 60 | 700 | 100 | Comparative example |
| 88 | I | 5 | 900 | 60 | 700 | 100 | Comparative example |
| 89 | J | 5 | 900 | 60 | 700 | 100 | Comparative example |
| 90 | J | 5 | 900 | 60 | 750 | 500 | Example |
| 91 | K | 5 | 900 | 60 | 700 | 100 | Example |
| 92 | L | 5 | 900 | 60 | 700 | 100 | Comparative example |
| 93 | M | 5 | 900 | 60 | 700 | 100 | Example |
| 94 | B | 5 | 900 | 60 | 700 | 100 | Comparative example |
| 95 | A | 5 | 900 | 60 | 700 | 100 | Comparative example |

TABLE 4

| | Microstructure of cold-rolled steel sheet | | | | | Microstructure of hot-pressed member | | | | |
|---|---|---|---|---|---|---|---|---|---|---|
| | Martensite | | Ferrite | | Ti-based precipitates smaller than 0.10 μm (counts/ 100 μm²) | Martensite | | Prior austenite | | Ti-based precipitates smaller than 0.10 μm (counts/ 100 μm²) |
| Specimen No. | Volume fraction (%) | Average grain size (μm) | Volume fraction (%) | Average grain size (μm) | | Volume fraction (%) | Average grain size (μm) | Cementite (counts/ 200 μm²) | | Remarks |
| 1 | 10 | 2 | 75 | 5 | 24 | 98 | 6 | 20 | 21 | Example |
| 2 | 12 | 3 | 78 | 5 | 22 | 100 | 5 | 21 | 22 | Example |
| 3 | 24 | 3 | 61 | 6 | 24 | 99 | 5 | 23 | 28 | Example |
| 4 | 18 | 3 | 74 | 6 | 21 | 97 | 7 | 24 | 22 | Example |
| 5 | 22 | 3 | 70 | 6 | 29 | 95 | 6 | 29 | 33 | Example |
| 6 | 8 | 2 | 80 | 7 | 30 | 97 | 6 | 24 | 24 | Example |
| 7 | 11 | 2 | 76 | 6 | 25 | 99 | 7 | 21 | 22 | Example |
| 8 | 15 | 3 | 76 | 6 | 26 | 98 | 6 | 23 | 24 | Example |
| 9 | 15 | 2 | 75 | 6 | 24 | 97 | 6 | 22 | 23 | Example |
| 10 | 16 | 3 | 78 | 5 | 26 | 99 | 6 | 24 | 22 | Example |
| 11 | 18 | 3 | 74 | 6 | 25 | 98 | 7 | 23 | 25 | Example |
| 12 | 14 | 3 | 73 | 6 | 22 | 100 | 7 | 22 | 22 | Example |
| 13 | 9 | 2 | 82 | 5 | 26 | 97 | 7 | 21 | 24 | Example |
| 14 | 14 | 3 | 79 | 6 | 27 | 99 | 6 | 25 | 22 | Example |
| 15 | 23 | 3 | 68 | 5 | 31 | 99 | 6 | 21 | 23 | Example |
| 16 | 19 | 3 | 77 | 7 | 26 | 99 | 6 | 22 | 24 | Example |
| 17 | 24 | 3 | 69 | 6 | 25 | 99 | 6 | 25 | 21 | Example |
| 18 | 24 | 3 | 68 | 5 | 24 | 99 | 7 | 24 | 23 | Example |
| 19 | 18 | 3 | 69 | 6 | 25 | 99 | 6 | 23 | 22 | Example |
| 20 | 22 | 3 | 67 | 6 | 26 | 98 | 7 | 24 | 25 | Example |
| 21 | 8 | 2 | 88 | 6 | 25 | 98 | 6 | 25 | 15 | Example |
| 22 | 11 | 2 | 78 | 6 | 28 | 98 | 6 | 22 | 18 | Example |
| 23 | 15 | 3 | 77 | 7 | 24 | 100 | 7 | 21 | 19 | Example |
| 24 | 15 | 3 | 76 | 6 | 25 | 99 | 6 | 22 | 20 | Example |
| 25 | 16 | 3 | 76 | 6 | 25 | 98 | 5 | 25 | 16 | Example |
| 26 | 23 | 3 | 68 | 5 | 26 | 97 | 6 | 22 | 15 | Example |
| 27 | 11 | 3 | 80 | 5 | 25 | 99 | 7 | 21 | 14 | Example |
| 28 | 15 | 2 | 69 | 6 | 28 | 98 | 7 | 22 | 19 | Example |
| 29 | 15 | 3 | 80 | 5 | 25 | 100 | 6 | 21 | 19 | Example |
| 30 | 16 | 2 | 80 | 6 | 26 | 97 | 6 | 23 | 20 | Example |
| 31 | 15 | 3 | 78 | 7 | 24 | 99 | 7 | 24 | 22 | Example |
| 32 | 10 | 3 | 77 | 5 | 26 | 99 | 6 | 29 | 24 | Example |
| 33 | 16 | 3 | 79 | 6 | 25 | 99 | 6 | 24 | 23 | Example |
| 34 | 18 | 3 | 75 | 6 | 22 | 99 | 6 | 21 | 22 | Example |
| 35 | 11 | 3 | 76 | 5 | 26 | 99 | 7 | 23 | 18 | Example |
| 36 | 15 | 2 | 74 | 6 | 27 | 99 | 7 | 22 | 33 | Example |
| 37 | 15 | 2 | 72 | 6 | 31 | 99 | 7 | 24 | 24 | Example |

TABLE 4-continued

|  | Microstructure of cold-rolled steel sheet ||||| Microstructure of hot-pressed member |||||  |
| --- | --- | --- | --- | --- | --- | --- | --- | --- | --- | --- |
|  | Martensite || Ferrite || Ti-based precipitates smaller than | Martensite | Prior austenite |  | Ti-based precipitates smaller than |  |
| Specimen No. | Volume fraction (%) | Average grain size (μm) | Volume fraction (%) | Average grain size (μm) | 0.10 μm (counts/ 100 μm²) | Volume fraction (%) | Average grain size (μm) | Cementite (counts/ 200 μm²) | 0.10 μm (counts/ 100 μm²) | Remarks |
| 38 | 18 | 3 | 70 | 5 | 26 | 98 | 6 | 23 | 22 | Example |
| 39 | 14 | 3 | 80 | 6 | 25 | 97 | 6 | 22 | 24 | Example |
| 40 | 9 | 2 | 81 | 7 | 24 | 99 | 6 | 21 | 23 | Example |
| 41 | 14 | 3 | 79 | 6 | 25 | 98 | 6 | 22 | 22 | Example |
| 42 | 23 | 3 | 71 | 6 | 26 | 98 | 7 | 21 | 25 | Example |
| 43 | 10 | 2 | 81 | 6 | 25 | 98 | 6 | 22 | 22 | Example |
| 44 | 15 | 3 | 75 | 5 | 28 | 99 | 7 | 25 | 24 | Example |
| 45 | 15 | 2 | 79 | 6 | 24 | 99 | 6 | 22 | 22 | Example |
| 46 | 16 | 3 | 78 | 7 | 20 | 99 | 6 | 21 | 23 | Example |
| 47 | 23 | 3 | 68 | 6 | 21 | 99 | 7 | 22 | 24 | Example |
| 48 | 11 | 2 | 80 | 5 | 25 | 99 | 6 | 21 | 21 | Example |
| 49 | 15 | 3 | 80 | 6 | 21 | 99 | 5 | 23 | 23 | Example |
| 50 | 15 | 2 | 77 | 6 | 24 | 98 | 7 | 24 | 22 | Example |
| 51 | 22 | 3 | 68 | 6 | 25 | 97 | 7 | 29 | 25 | Example |
| 52 | 8 | 2 | 81 | 6 | 25 | 99 | 6 | 24 | 22 | Example |
| 53 | 11 | 3 | 80 | 6 | 26 | 95 | 6 | 21 | 25 | Example |
| 54 | 15 | 2 | 80 | 5 | 25 | 97 | 6 | 21 | 22 | Example |
| 55 | 15 | 3 | 77 | 6 | 28 | 99 | 6 | 23 | 24 | Example |
| 56 | 16 | 2 | 77 | 7 | 25 | 98 | 7 | 24 | 22 | Example |
| 57 | 22 | 3 | 65 | 5 | 26 | 97 | 6 | 29 | 23 | Example |
| 58 | 8 | 3 | 81 | 6 | 24 | 99 | 7 | 24 | 24 | Example |
| 59 | 11 | 2 | 80 | 6 | 26 | 98 | 6 | 21 | 21 | Example |
| 60 | 15 | 3 | 80 | 5 | 25 | 100 | 6 | 23 | 23 | Example |
| 61 | 15 | 2 | 79 | 6 | 22 | 97 | 7 | 22 | 22 | Example |
| 62 | 15 | 3 | 79 | 6 | 26 | 99 | 6 | 24 | 24 | Example |
| 63 | 16 | 3 | 79 | 5 | 27 | 99 | 5 | 23 | 23 | Example |
| 64 | 15 | 3 | 77 | 6 | 31 | 99 | 6 | 22 | 22 | Example |
| 65 | 10 | 3 | 82 | 7 | 25 | 99 | 7 | 21 | 25 | Example |
| 66 | 16 | 3 | 79 | 6 | 28 | 99 | 7 | 22 | 22 | Example |
| 67 | 18 | 2 | 78 | 6 | 25 | 99 | 6 | 21 | 24 | Example |
| 68 | 11 | 3 | 77 | 6 | 26 | 98 | 6 | 22 | 22 | Example |
| 69 | 15 | 2 | 80 | 6 | 25 | 97 | 7 | 25 | 23 | Example |
| 70 | 15 | 3 | 80 | 5 | 28 | 99 | 6 | 24 | 24 | Example |
| 71 | 18 | 2 | 70 | 6 | 24 | 95 | 6 | 21 | 25 | Example |
| 72 | 11 | 3 | 79 | 7 | 20 | 97 | 7 | 21 | 22 | Example |
| 73 | 15 | 3 | 80 | 5 | 21 | 99 | 6 | 16 | 29 | Example |
| 74 | 15 | 3 | 80 | 7 | 25 | 98 | 6 | 35 | 19 | Example |
| 75 | 18 | <u>5</u> | 78 | 6 | <u>5</u> | 94 | <u>9</u> | <u>7</u> | <u>9</u> | Comparative example |
| 76 | 19 | <u>5</u> | 67 | 6 | <u>11</u> | 95 | 8 | 12 | <u>7</u> | Comparative example |
| 77 | 18 | <u>5</u> | 70 | 8 | <u>4</u> | 99 | 8 | <u>8</u> | <u>4</u> | Comparative example |
| 78 | 19 | <u>5</u> | 74 | 7 | <u>6</u> | 97 | 7 | <u>8</u> | <u>4</u> | Comparative example |
| 79 | 18 | <u>6</u> | 72 | 6 | <u>8</u> | 96 | 7 | <u>8</u> | <u>9</u> | Comparative example |
| 80 | 10 | <u>5</u> | 78 | 6 | <u>11</u> | 98 | 7 | 15 | <u>5</u> | Comparative example |
| 81 | 12 | <u>5</u> | 72 | 7 | <u>4</u> | 98 | <u>9</u> | <u>4</u> | <u>4</u> | Comparative example |
| 82 | <u>0</u> | — | 90 | 8 | 25 | 98 | <u>9</u> | <u>3</u> | 14 | Comparative example |
| 83 | <u>71</u> | <u>7</u> | 20 | 5 | <u>2</u> | 94 | <u>9</u> | <u>7</u> | <u>7</u> | Comparative example |
| 84 | <u>4</u> | 1 | 90 | 6 | <u>7</u> | 96 | <u>10</u> | 34 | <u>5</u> | Comparative example |
| 85 | <u>3</u> | 2 | 88 | 7 | <u>14</u> | 97 | <u>9</u> | <u>7</u> | <u>7</u> | Comparative example |
| 86 | <u>4</u> | 2 | 90 | 6 | <u>11</u> | 98 | 7 | <u>9</u> | <u>8</u> | Comparative example |
| 87 | <u>4</u> | 2 | 91 | 6 | 20 | 98 | 5 | 22 | 18 | Comparative example |
| 88 | 24 | <u>6</u> | 68 | 7 | <u>13</u> | 99 | 7 | 21 | <u>9</u> | Comparative example |
| 89 | 28 | <u>5</u> | 70 | 6 | 20 | 98 | 6 | <u>5</u> | 16 | Comparative example |
| 90 | 15 | 3 | 75 | 6 | 20 | 99 | 6 | 11 | 13 | Example |
| 91 | 14 | 3 | 78 | 6 | 21 | 98 | 7 | 12 | 12 | Example |
| 92 | 18 | <u>5</u> | 71 | 6 | <u>10</u> | 98 | 6 | <u>8</u> | <u>7</u> | Comparative example |
| 93 | 21 | 3 | 68 | 5 | 21 | 99 | 6 | 25 | 23 | Example |
| 94 | 16 | <u>6</u> | 81 | 7 | <u>15</u> | 99 | <u>9</u> | <u>8</u> | <u>8</u> | Comparative example |
| 95 | 17 | <u>5</u> | 68 | 7 | <u>15</u> | 99 | <u>9</u> | <u>8</u> | <u>7</u> | Comparative example |

Underlined if outside the range of the disclosure.

TABLE 5

| Specimen No. | Tensile strength TS (MPa) | Delayed fracture resistance | Cross tensile strength | Remarks |
|---|---|---|---|---|
| 1 | 1830 | Good | Good | Example |
| 2 | 1881 | Good | Good | Example |
| 3 | 2054 | Good | Good | Example |
| 4 | 1855 | Good | Good | Example |
| 5 | 1864 | Good | Good | Example |
| 6 | 1801 | Good | Good | Example |
| 7 | 1822 | Good | Good | Example |
| 8 | 1813 | Good | Good | Example |
| 9 | 1790 | Good | Good | Example |
| 10 | 1830 | Good | Good | Example |
| 11 | 1822 | Good | Good | Example |
| 12 | 1812 | Good | Good | Example |
| 13 | 1815 | Good | Good | Example |
| 14 | 1822 | Good | Good | Example |
| 15 | 1821 | Good | Good | Example |
| 16 | 1822 | Good | Good | Example |
| 17 | 1834 | Good | Good | Example |
| 18 | 1885 | Good | Good | Example |
| 19 | 1845 | Good | Good | Example |
| 20 | 1834 | Good | Good | Example |
| 21 | 1846 | Good | Good | Example |
| 22 | 1855 | Good | Good | Example |
| 23 | 1824 | Good | Good | Example |
| 24 | 1834 | Good | Good | Example |
| 25 | 1834 | Good | Good | Example |
| 26 | 1850 | Good | Good | Example |
| 27 | 1848 | Good | Good | Example |
| 28 | 1884 | Good | Good | Example |
| 29 | 1821 | Good | Good | Example |
| 30 | 1818 | Good | Good | Example |
| 31 | 1994 | Good | Good | Example |
| 32 | 1798 | Good | Good | Example |
| 33 | 1818 | Good | Good | Example |
| 34 | 1822 | Good | Good | Example |
| 35 | 1819 | Good | Good | Example |
| 36 | 1833 | Good | Good | Example |
| 37 | 1843 | Good | Good | Example |
| 38 | 1985 | Good | Good | Example |
| 39 | 1821 | Good | Good | Example |
| 40 | 1819 | Good | Good | Example |
| 41 | 1822 | Good | Good | Example |
| 42 | 1834 | Good | Good | Example |
| 43 | 1848 | Good | Good | Example |
| 44 | 1816 | Good | Good | Example |
| 45 | 2013 | Good | Good | Example |
| 46 | 1854 | Good | Good | Example |
| 47 | 1824 | Good | Good | Example |
| 48 | 1833 | Good | Good | Example |
| 49 | 1819 | Good | Good | Example |
| 50 | 1824 | Good | Good | Example |
| 51 | 1834 | Good | Good | Example |
| 52 | 1994 | Good | Good | Example |
| 53 | 1845 | Good | Good | Example |
| 54 | 1834 | Good | Good | Example |
| 55 | 1825 | Good | Good | Example |
| 56 | 1819 | Good | Good | Example |
| 57 | 1834 | Good | Good | Example |
| 58 | 1834 | Good | Good | Example |
| 59 | 1994 | Good | Good | Example |
| 60 | 1841 | Good | Good | Example |
| 61 | 1819 | Good | Good | Example |
| 62 | 1810 | Good | Good | Example |
| 63 | 1813 | Good | Good | Example |
| 64 | 1822 | Good | Good | Example |
| 65 | 1834 | Good | Good | Example |
| 66 | 1821 | Good | Good | Example |
| 67 | 1812 | Good | Good | Example |
| 68 | 1822 | Good | Good | Example |
| 69 | 1831 | Good | Good | Example |
| 70 | 1815 | Good | Good | Example |
| 71 | 1808 | Good | Good | Example |
| 72 | 1809 | Good | Good | Example |
| 73 | 1822 | Good | Good | Example |
| 74 | 1809 | Good | Good | Example |
| 75 | 1833 | Poor | Poor | Comparative example |
| 76 | 1855 | Poor | Poor | Comparative example |
| 77 | 1833 | Poor | Poor | Comparative example |
| 78 | 1833 | Poor | Poor | Comparative example |
| 79 | 1846 | Poor | Poor | Comparative example |
| 80 | 1811 | Poor | Poor | Comparative example |
| 81 | 1805 | Poor | Poor | Comparative example |
| 82 | 1812 | Poor | Good | Comparative example |
| 83 | 1849 | Poor | Poor | Comparative example |
| 84 | 1914 | Poor | Poor | Comparative example |
| 85 | 1894 | Poor | Poor | Comparative example |
| 86 | 1944 | Poor | Poor | Comparative example |
| 87 | <u>1588</u> | Good | Good | Comparative example |
| 88 | 2433 | Poor | Poor | Comparative example |
| 89 | 1884 | Poor | Poor | Comparative example |
| 90 | 1822 | Fair | Fair | Example |
| 91 | 1834 | Fair | Fair | Example |
| 92 | 1810 | Poor | Poor | Comparative example |
| 93 | 1855 | Good | Good | Example |
| 94 | 1832 | Poor | Poor | Comparative example |
| 95 | 1844 | Poor | Poor | Comparative example |

Underlined if outside the range of the disclosure.

As can be seen from Table 5, all of our examples in which the chemical compositions and the microstructures of hot-pressed members satisfy the appropriate ranges of the present disclosure have excellent delayed fracture resistance and high cross tensile strength after resistance spot welding, not to mention high tensile strength.

The invention claimed is:

1. A cold-rolled steel sheet for hot pressing, comprising:
   a chemical composition containing, by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, Ti: 0.005% or more and 0.15% or less, and at least one selected from the group consisting of Mo: 0.50% or less and Cr: 0.50% or less, with the balance being Fe and inevitable impurities; and
   a microstructure which contains 5% to 45% by volume fraction of martensite having an average grain size of 4 μm or less, and at least 15 Ti-based precipitates having a grain size of less than 0.10 μm present on average per 100 μm² of a cross section parallel to the thickness direction of the steel sheet in a range of 100 μm in the thickness direction from the surface of the steel sheet.

2. The cold-rolled steel sheet for hot pressing according to claim 1, wherein the chemical composition further contains, by mass %, at least one selected from Nb: 0.15% or less, B: 0.0050% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

3. The cold-rolled steel sheet for hot pressing according to claim 1, wherein among other components in the chemical composition of the steel sheet, C, P, Mn, Cr, Mo, and Ti satisfy:

$$(6[C]+2[Mn]+49[P])/([Cr]/2+[Mo]/3+7[Ti]) \leq 30.5 \qquad (1),$$

where [M] denotes the content by mass % of an element M, and is calculated as 0 when the element M is not contained.

4. The cold-rolled steel sheet for hot pressing according to claim 1, wherein the steel sheet comprises on a surface thereof an Al or Al alloy coating or plating layer or a Zn or Zn alloy coating or plating layer.

5. A method for manufacturing the cold-rolled steel sheet for hot pressing as recited in claim 1, the method comprising:
preparing a molten steel comprising a chemical composition containing, by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, Ti: 0.005% or more and 0.15% or less, and at least one selected from the group consisting of Mo: 0.50% or less and Cr: 0.50% or less, with the balance being Fe and inevitable impurities, subjecting the molten steel to continuous casting to obtain a slab, and cooling the slab to 650° C. within 6 hours;
then reheating and hot rolling the slab to obtain a hot-rolled steel sheet under a set of conditions including a rolling reduction of 12% or more at a final pass of finish rolling, a rolling reduction of 15% or more at a pass immediately before the final pass, and a finisher delivery temperature of 860° C. to 950° C.;
after the hot rolling, subjecting the hot-rolled steel sheet to primary cooling whereby the hot-rolled steel sheet is cooled to a cooling end temperature of 700° C. or lower at a first average cooling rate of 70° C./s or higher up to the cooling end temperature;
after the primary cooling, subjecting the steel sheet to secondary cooling whereby the steel sheet is coiled at a coiling temperature of 450° C. or lower at a second average cooling rate of 5° C./s to 50° C./s up to the coiling temperature;
then pickling the coiled hot-rolled steel sheet, and then cold rolling the steel sheet to obtain a cold-rolled steel sheet, then subjecting the cold-rolled steel sheet to annealing whereby the cold-rolled steel sheet is heated to a temperature range of 700° C. to 830° C. at an average heating rate of 5° C./s to 20° C./s and subjected to 15 seconds to 600 seconds of soaking in the temperature range of 700° C. to 830° C.; and
after the soaking, subjecting the cold-rolled steel sheet to a tertiary cooling whereby the cold-rolled steel sheet is cooled to a cooling end temperature of 600° C. or lower at a third average cooling rate of 5° C./s or higher.

6. The method for manufacturing the cold-rolled steel sheet for hot pressing according to claim 5, wherein
the chemical composition further contains, by mass %, at least one selected from the group consisting of Nb: 0.15% or less, B: 0.0050% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

7. The method for manufacturing the cold-rolled steel sheet for hot pressing according to claim 5, wherein among other components in the chemical composition of the molten steel, C, P, Mn, Cr, Mo, and Ti satisfy:

$$(6[C]+2[Mn]+49[P])/([Cr]/2+[Mo]/3+7[Ti]) \leq 30.5 \quad (1),$$

where [M] denotes the content by mass % of an element M, and is calculated as 0 when the element M is not contained.

8. The method for manufacturing the cold-rolled steel sheet for hot pressing according to claim 5, the method further comprising:
after the tertiary cooling, applying an Al or Al alloy coating or plating treatment or a Zn or Zn alloy coating or plating treatment to a surface of the cold-rolled steel sheet.

9. A method for manufacturing a hot-pressed member, comprising:
heating the cold-rolled steel sheet for hot pressing as recited in claim 1 in a temperature range of an $Ac_3$ transformation temperature to 1000° C.; and
then hot pressing the steel sheet.

* * * * *

UNITED STATES PATENT AND TRADEMARK OFFICE
CERTIFICATE OF CORRECTION

| | |
|---|---|
| PATENT NO. | : 11,420,247 B2 |
| APPLICATION NO. | : 16/618243 |
| DATED | : August 23, 2022 |
| INVENTOR(S) | : Katsutoshi Takashima et al. |

It is certified that error appears in the above-identified patent and that said Letters Patent is hereby corrected as shown below:

On the Title Page

Please insert the following information as item (30) (Foreign Application Priority Data):
--Jun. 30, 2017 (WO) ......... PCT/JP2017/024257--.

Signed and Sealed this
Twentieth Day of December, 2022

Katherine Kelly Vidal
*Director of the United States Patent and Trademark Office*